United States Patent [19]
Gommori et al.

[11] Patent Number: 5,092,011
[45] Date of Patent: Mar. 3, 1992

[54] DISK WASHING APPARATUS

[75] Inventors: Kazuhiko Gommori, Ninomiya; Hisayoshi Ichikawa, Minami-Ashigara; Takahisa Ishida, Hadano, all of Japan

[73] Assignee: Hitachi Electronics Engineering Co., Ltd., Tokyo, Japan

[21] Appl. No.: 684,159

[22] Filed: Apr. 12, 1991

Related U.S. Application Data

[63] Continuation-in-part of Ser. No. 462,636, Jan. 9, 1990, abandoned.

[30] Foreign Application Priority Data

Jul. 13, 1989 [JP] Japan ................... 1-178982
Sep. 27, 1989 [JP] Japan ................ 1-112089[U]
Sep. 27, 1989 [JP] Japan ................... 1-249302

[51] Int. Cl.⁵ .................. B08B 11/02; A46B 13/04
[52] U.S. Cl. ........................... 15/88.2; 15/88.3; 15/88.4; 15/97.1; 198/576; 198/578; 134/78; 134/902
[58] Field of Search ............ 15/21 R, 88.2, 88.3, 15/97 R, 77; 134/76, 902, 78

[56] References Cited

U.S. PATENT DOCUMENTS 4,899,768 2/1990 Yatabe .................... 134/76

FOREIGN PATENT DOCUMENTS 2854804 6/1979 Fed. Rep. of Germany ..... 15/21 D
1574745 6/1969 France ........................ 15/21 D Primary Examiner—Edward L. Roberts
Attorney, Agent, or Firm—Oblon, Spivak, McClelland, Maier & Neustadt

[57] ABSTRACT

Described herein is a disk washing apparatus for cleaning substrate disks of memory medium, which comprises in combination: a loader section having a magazine for holding a number of disks to be washed; a working section including a washing stage arranged to wash the front and rear faces of a disk simultaneously with inner and outer peripheral surfaces thereof, a rinsing stage arranged to rinse the front and rear faces of a disk simultaneously with inner and outer peripheral surfaces thereof, and a drying stage adapted to dry a washed and rinsed disk by high speed spin drying; an unloader section having a magazine for accommodating cleaned disks; and disk transfer chucks adapted to transfer disks one after another stepwise from the loader section to the unloader section, passing the disks successively to the washing, rinsing and drying stages of the working section, the washing, rinsing, and drying stages being located in series between the loader and unloader sections.

11 Claims, 21 Drawing Sheets

FIG. 4
FIG. 5
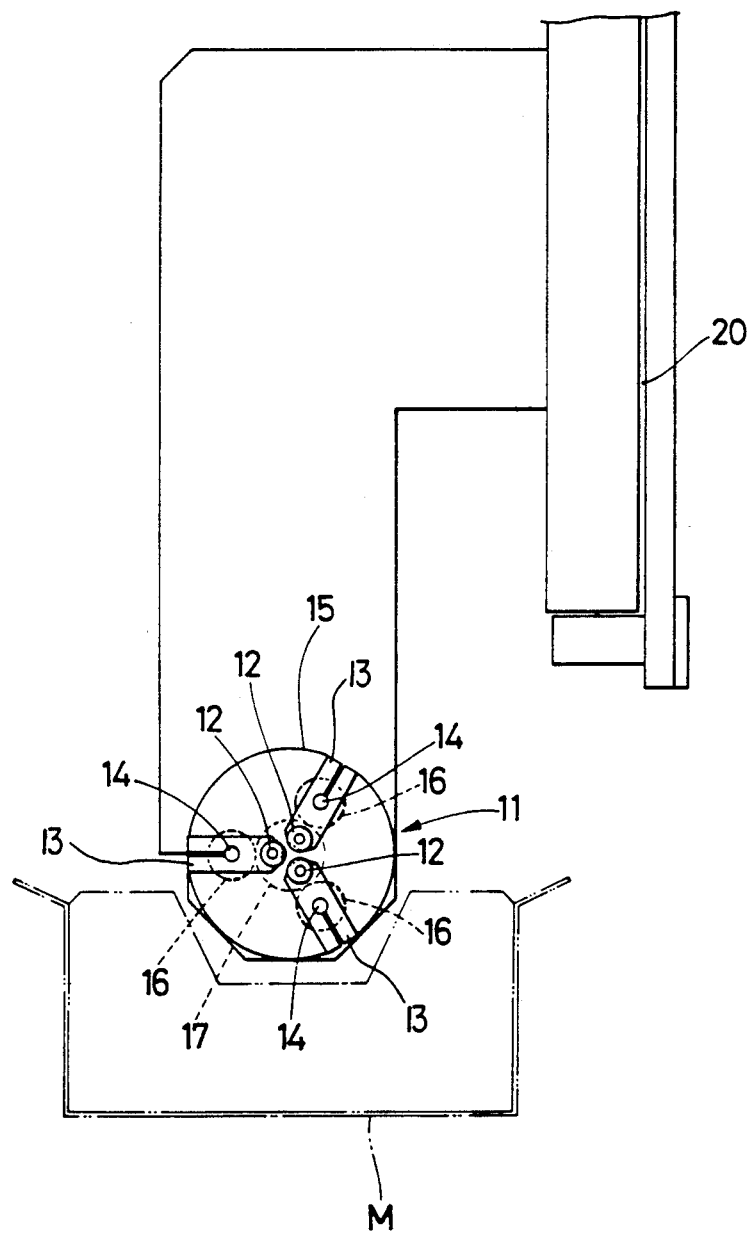
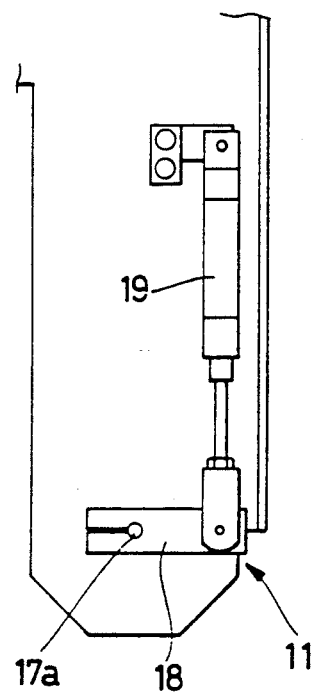

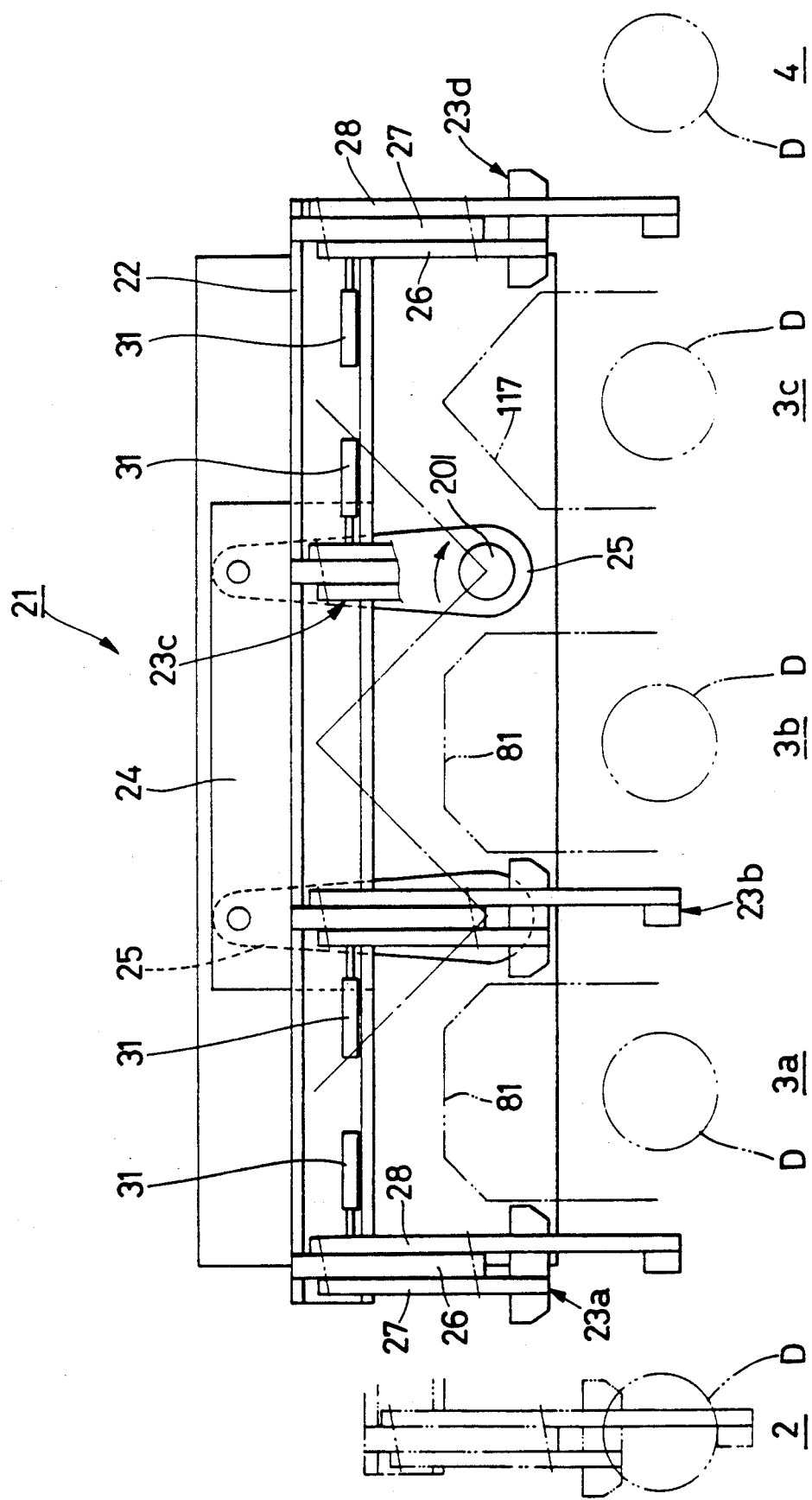

FIG.15
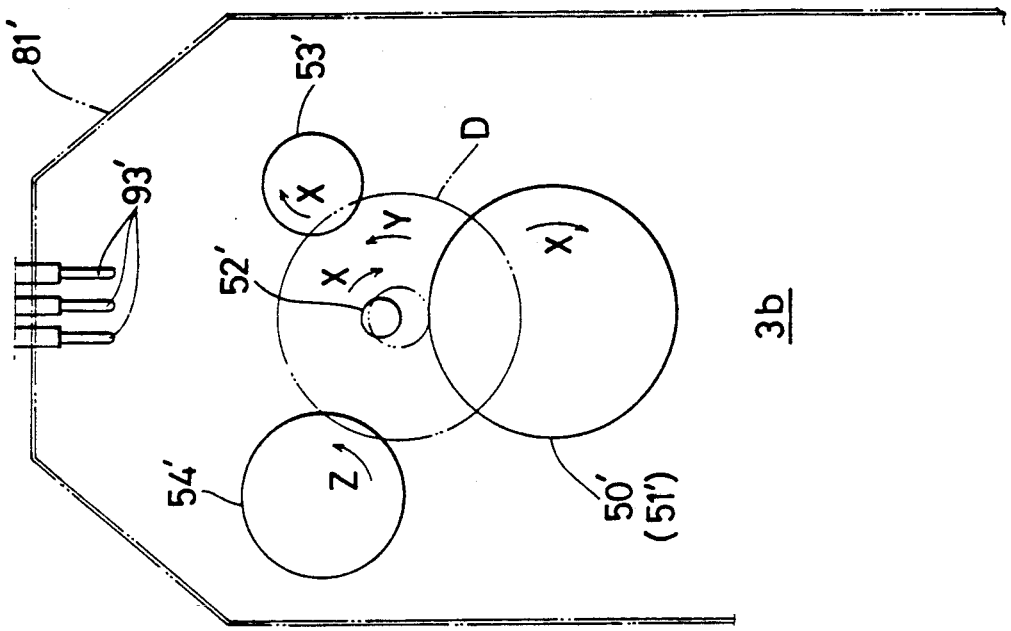
3b
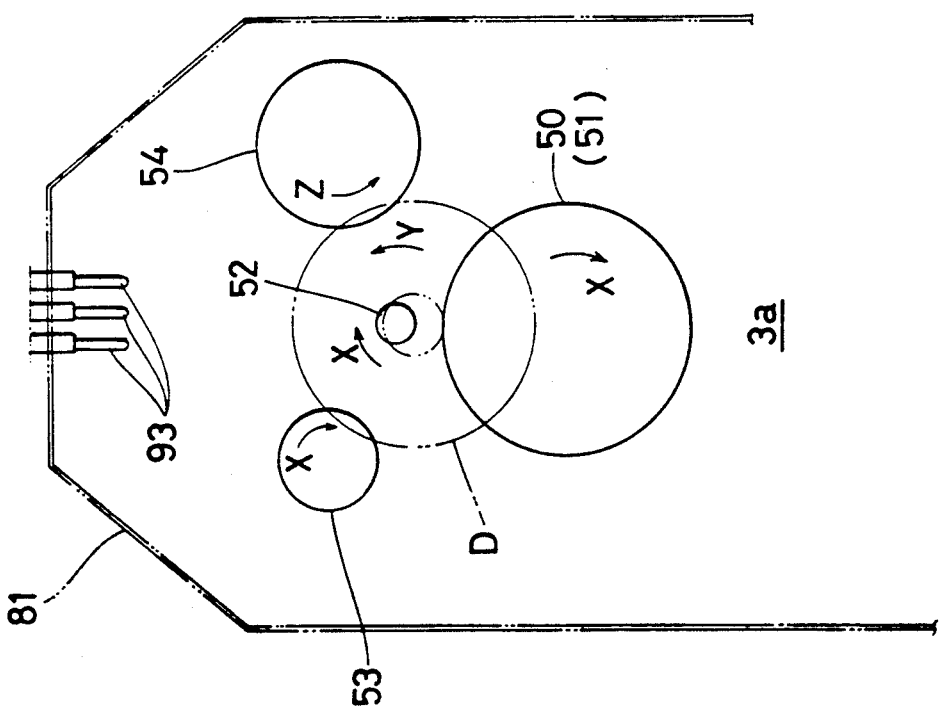
3a

DISK WASHING APPARATUS

This application is a continuation-in-part of application Ser. No. 07/462,636, filed on Jan. 9, 1990, now abandoned.

BACKGROUND OF THE INVENTION

1. Field of the Invention

This invention relates to a disk washing apparatus for washing circular substrate disks of memory media to be used as magnetic disks, optical disks or the like.

2. Prior Art

For example, in the production of magnetic disks which have a magnetic recording film layer formed on the surfaces on the opposite sides of a circular metal substrate of aluminum or the like, the opposite surfaces of the substrate disk need to be washed clean prior to forming the magnetic recording film layers. Not only dusts including polishing powder remaining on the substrate surfaces but also stains of oil films have to be cleaned off by disk washing to put the surfaces in a completely clean state since a trace of dust or blemish could be a trouble to the formation of a recording film. Especially in view of the recent trend toward the adoption thinner recording films for the improvement of recording density or for enhancing the write-in and read-out speeds, a trace of foreign matter or blemish on the surfaces which support a thin recording film will impose great influences on the accuracy of information write-in and read-out operations. Accordingly, washing substrate disks into a completely clean state is a matter of utmost importance from the standpoint of maintaining and improving the quality of magnetic disks.

In this connection, the current disk washing apparatus are largely classified into an ultrasonic wave washing type and a brush washing type. The ultrasonic wave washing type which is extremely effective for removing foreign matter has a problem that it is incapable of removing stains like oil films which have deposited on disk surfaces. On the other hand, the brush washing type which uses a detergent is effective for cleaning off not only foreign matter but also deposited stains from disk surfaces, and for this reason generally accepted these days.

The brush type washing operation generally consists of three stages, more specifically, a washing stage, a rinsing stage and a drying stage. In the washing stage, while supplying a detergent like a neutral cleaning solution, the front and rear surfaces of a disk substrate are brushed to wash off deposited foreign matter and stains from the disk surfaces. In the succeeding rinsing stage, the detergent is washed off with the use of pure water and by either shower rinsing or brush rinsing. Of these two types of rinsing, the brush rinsing is advantageous in a case where perfection is sought for. The last drying stage serves to remove water drops and moisture from the disk surfaces, for example, by the so-called high-speed spin drying in which the disk is put in high speed rotation.

In order to make the disk washing and rinsing more perfect, it is necessary to wash and rinse not only the front and rear disk faces but also the edge portions at the inner and outer peripheries of a disk. For this purpose, it has been the general practice to employ two-step washing and rinsing operations, namely, a washing operation consisting of a first step of brush-washing the edge portions at the outer and/or inner periphery of a disk and a second step of washing the front and rear disk faces, followed by a two-step rinsing operation which similarly consists of a first edge rinsing step and a second face rinsing step.

However, despite the advantage that the entire areas of the disk surfaces are perfectly washed, the two-step washing and rinsing operations have problems that the washing operation involves an increased number of steps and takes a longer time, coupled with a drawback that there has to be provided a washing apparatus of complicate construction and larger size. Besides, there are possibilities of foreign matter or contaminants migrating into and re-spoiling the inner and outer peripheral portions during the face washing subsequent to the edge washing, or possibilities of a detergent re-depositing on the inner and outer peripheral portions during the face rinsing.

SUMMARY OF THE INVENTION

In view of the foregoing situations, the present invention has as its object the provision of a disk washing apparatus which is simple and compact in construction and capable of cleaning disks perfectly in a prompt and efficient manner.

According to the present invention, the above-mentioned object is achieved by the provision of a disk washing apparatus which, comprises in combination: a loader section having a magazine for holding disks to be washed; a working section including a washing stage arranged to wash front and rear faces of a disk simultaneously with inner and outer peripheral surfaces thereof, a rinsing stage arranged to rinse the front and rear faces of the washed disk simultaneously with inner and outer peripheral surface thereof, and a drying stage arranged to dry the washed and rinsed disk by high speed spin drying; an unloader section having a magazine for receiving cleaned disks; and a disk transfer means adapted to transfer a disk from the loader section to the unloader section, passing same successively to the washing rinsing and drying stages of the working section located in series between the loader and unloader sections.

BRIEF DESCRIPTION OF THE DRAWINGS

The above and other objects, features and advantages of the invention will become apparent from the following description and the appended claims, taken in conjunction with the accompanying drawings which show by way of example preferred embodiments of the invention and in which:

FIG. 4 is a schematic view of a loader chuck means;

FIG. 5 is a back view of the loader chuck means of FIG. 4;

FIG. 6 is a schematic front view of a stepwise disk feeder means

FIG. 15 is a diagrammatic illustration explanatory of operations by the washing and rinsing brushes;

DESCRIPTION OF PREFERRED EMBODIMENTS

Figure 1:
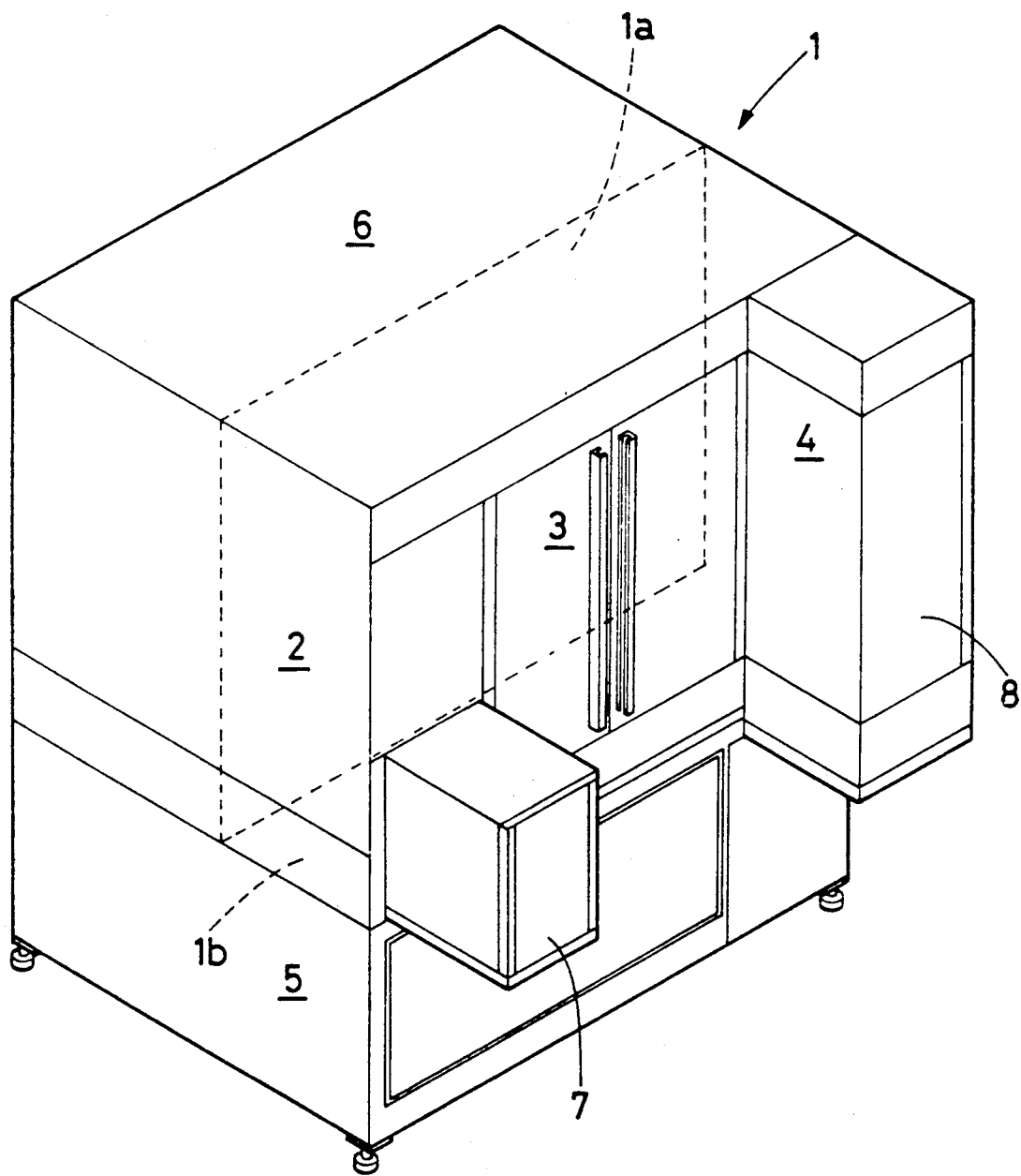
FIG. 1 is a schematic perspective view of a disk washing apparatus embodying the present invention.

Now, the invention is described particularly by way of the embodiments shown in the drawings.

Figure 2:
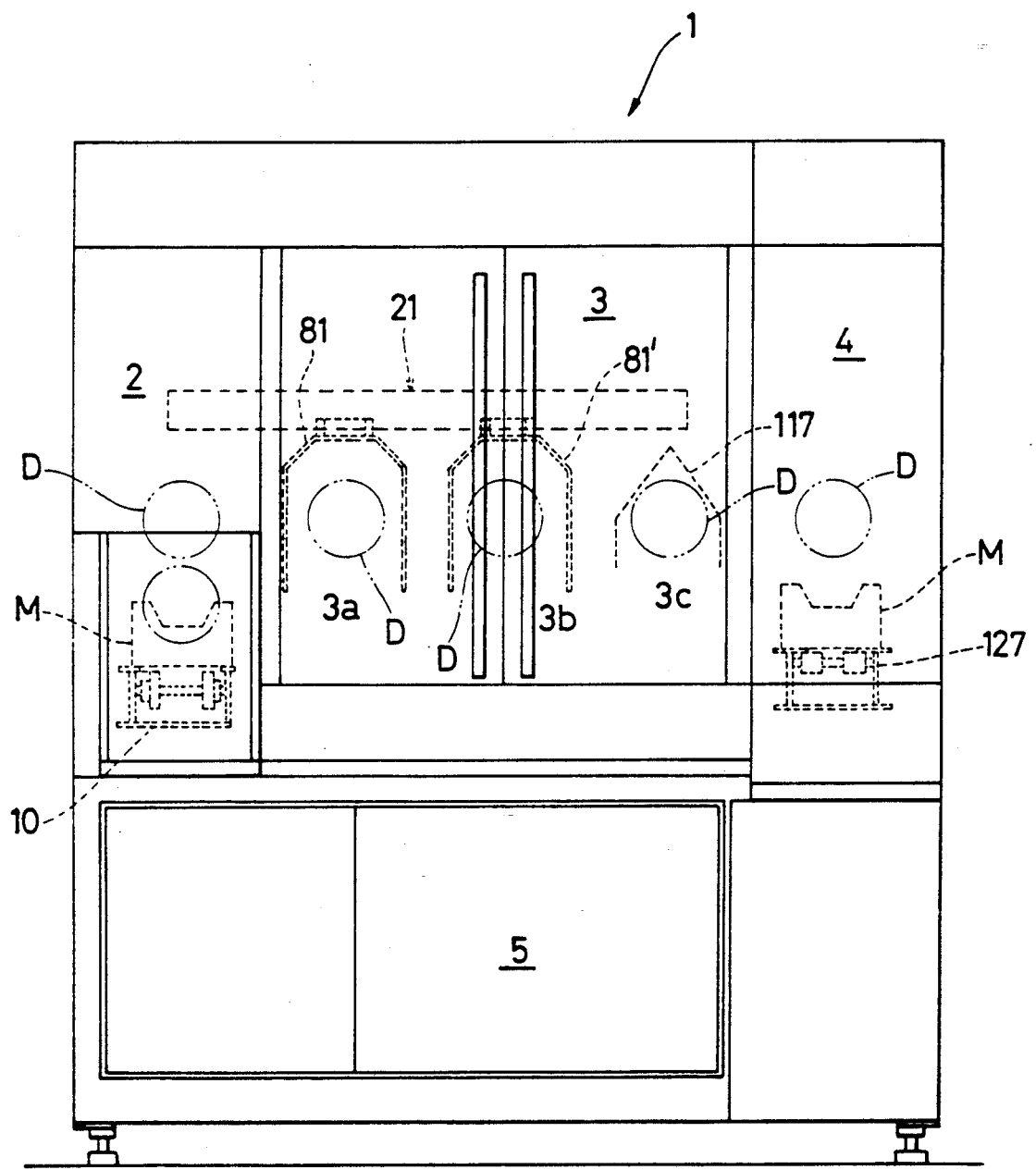
FIG. 2 is a schematic front view of the apparatus of FIG. 1.

Referring first to FIGS. 1 and 2, there is shown the outline of the disk washing apparatus as a whole, wherein the reference 1 indicates the housing of the disk washing apparatus, defining therein a loader section 2, a working section 3 and an unloader section 4 and provided with a control section 5 on the lower side and a drive section 6 on the back side thereof. The working section 3 is divided into a washing stage 3a, a rinsing stage 3b and a drying stage 3c. The control section 5 and drive section 6 are secluded from the loader section 2, working section 3 and unloader section 4 by a partition wall 1a and a bottom wall 1b of the housing 1.

Provided on the front side of the housing 1 are a disk introducing portion 7 for charging disks D to be sent to the loader section 2 for the washing treatment, and a disk ejecting portion 8 for discharging cleaned disks D from the unloader section 4. These disk introducing and ejecting portions 7 and 8 are each provided with a transparent door which is opened when introducing wash-needing disks D into the apparatus or when ejecting cleaned disks K from the apparatus. In order to permit the operator to see the working condition of the apparatus, a transparent door is also provided on the front side of the working section 3, which is opened in case of a trouble or trouble-shooting or repair.

Figure 3:
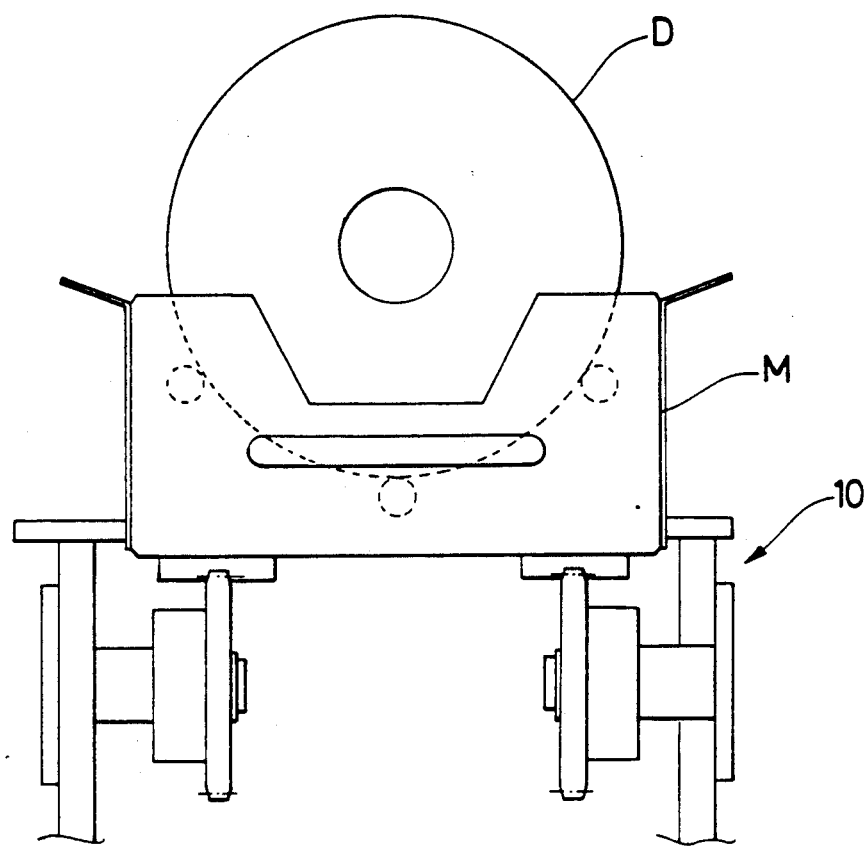
FIG. 3(a) is a fragmentary side of a disk magazine.
FIG. 3(b) is a schematic front view of the magazine mounted on a conveyer.
Figure 3:
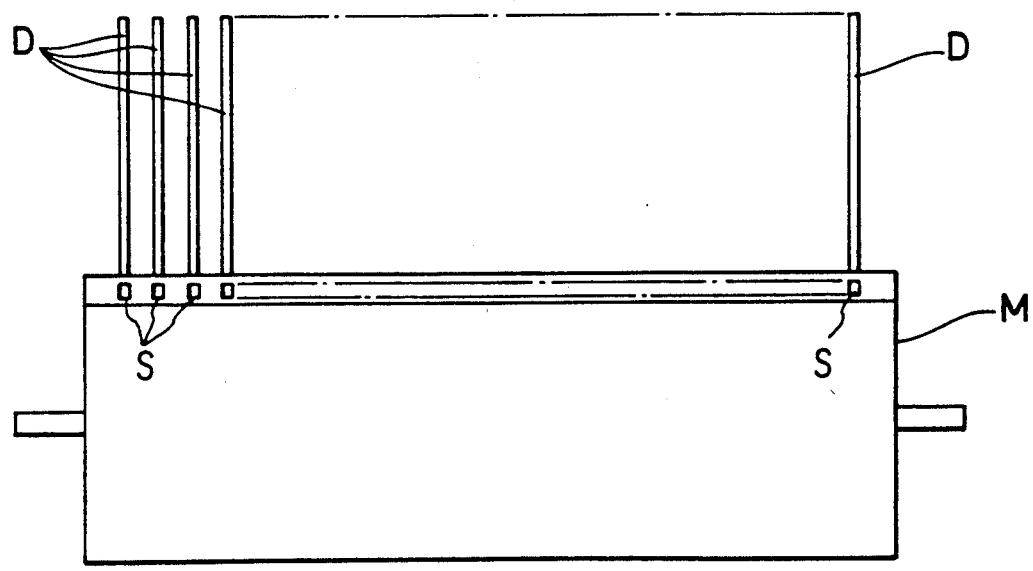

As shown particularly in FIGS. 3(a) and 3(b), the disks D are sent into the apparatus on a magazine M which holds a large number of disks D side by side in upright positions, and the disks D which have undergone the washing operation are discharged from the apparatus again on a magazine M. Namely, a magazine M carrying disks D to be washed is set in the loader section 2, and an empty magazine M for receiving washed disks D is set in the unloader section 4.

The disk washing apparatus of the invention is arranged to permit washing treatments of a diversity of substrate disks of different sizes. In this regard, the following description illustrates an apparatus which is capable of washing two kinds of disks, 3.5 inch disks and 5 inch disks which are different in outer diameter but have the same inner diameter. Of course, the apparatus of the present invention can be arranged to handle a particular kind of disks of the same size or more than two types of disks which differ from each other not only in outer diameter but also in inner diameter.

In the loader section 2, the magazine M is mounted on a conveyer 10, and the disks D on the magazine M are picked up one after another while the magazine M is fed by the conveyer 10 intermittently by a distance equivalent to the space between adjacent disks D on the magazine M. This movement can be controlled, for example, by detecting slots "s" which are provided on the wing of the magazine M by a suitable sensor. For this purpose, a chuck loader 11 is provided in the loader section 2 as shown in FIGS. 4 and 5. The chuck loader 11 serves to hold the inner periphery of a disk D and is provided with three chuck members 12 which are releasably engageable with the inner periphery of a disk D. Each one of these chuck members 12 is mounted on a lever 13 which is rockable about a shaft 14 to move the corresponding chuck member 12 to and from a disk holding position in abutting engagement with the inner periphery of a disk D and a disk releasing position away from the inner periphery of a disk.

In order to switch the position of the chuck member 12, the base end of the shaft 14 which is extended into a gear box 15 is coupled with a follower gear 16, which is in meshing engagement with a drive gear 17. Shaft 17a of the drive gear 17, which is extended out of the gear box 15 in a direction away from the chuck member 12, is engaged with a drive lever 18 which is connected to a piston cylinder 19. Consequently, upon turning the drive lever 18 through a predetermined angle by operating the cylinder 19, the drive gear 17 is rotated, causing the follower gears 16 to turn therewith to switch the respective chuck members 12 between the disk holding position and disk releasing position.

Further, the loader chuck means 11 is arranged to lift up a disk D to a predetermined position after holding the latter by the chuck members 12. More specifically, the loader chuck means 11 is movable up and down along a vertical guide rail 20 by operation of a cylinder or other drive means which is not shown, between a lower position for picking up a disk D from the magazine M and an upper lifted position for handing over the disk D to the working section 3.

Accordingly, while the loader chuck means 11 is in the lower position, the conveyer 10 is operated to feed the magazine M forward by a distance corresponding to one pitch of the disks D on the magazine M, permitting the chuck members 12 of the loader chuck means 11 to get into a disk D in a preceding position on the magazine thus preventing the loader chuck means 11 from interfering with the disk D in the magazine M. Then, the chuck members 12 in the respective releasing position are moved into the disk holding position to hold the disk D. Thereafter, the loader chuck means 11 is lifted up to pick up a single disk D from the magazine M and to send it to the working section 3.

The disk D which has been picked up from the magazine M is successively fed through the washing stage 3a, rinsing stage 3b and drying stage 3c of the working section 3 by a stepwise feeder means 21 which serves to feed the disk D from the loader section 2 to the washing stage 3a, from the washing stage 3a to the rinsing stage 3b, from the rinsing stage 3b to the drying stage 3c and from the drying stage 3c to the unloader stage 4. The disk D which has undergone the washing, rinsing and drying treatments is discharged into the unloader section 4. For the purpose of simplifying the disk feed mechanism of the stepwise feeder means 21, the loader section 2, the washing stage 3a, rinsing stage 3b and drying stage 3c of the working section 3 and the unloader section 4 are located at uniform intervals, and the washing rinsing and drying stages 3a to 3c are positioned at the same height and in level with the disk hand-over positions of the loader and unloader sections 2 and 4. Further, the stepwise disk feeder means 21 is adapted to hold the outer peripheral surface of a disk D while feeding the disk in the horizontal direction.

The stepwise feeder means 21 is constructed as shown particularly in FIGS. 6, 6a, 6b, 6c and 7. Namely, the stepwise feeder means 21 includes a reciprocating plate member 22 mounting thereon four disk transfer chuck means 23a to 23d at intervals corresponding to the intervals between the loader section 2, washing stage 3a, rinsing stage 3b, drying stage 3c and unloader section 4. This reciprocating plate member 22 is mounted on a drive plate 24 which is pivotally connected to a pair of levers 25 at its opposite end portions. The levers 25 can be operated to perform a complex movement of swinging action and back-and-fourth action by a motor-driven indexing mechanism 200. In order to ensure such complex movement, the levers 25 are, respectively, connected to a pair of drive shafts 201 which are extended from the housing of the motor-driven indexing mechanism 200 through the partition wall 1a which partitions off the working section 3 from the drive section 6.

The motor-driven indexing mechanism 200 has a drive means to cause the rotating and axially reciprocating movements of the drive shafts 201. By rotating the drive shafts 201 in a predetermined range, the levers 25 permit the swinging motion so that the drive plate 24 can be reciprocated at the predetermined stroke to shift the disk transfer chuck means 23a to 23d between one section or stage and an adjacent stage or section. The sections and stages include the loader section 2, the washing stage 3a, the rinsing stage 3b, the drying stage 3c and the unloader stage 4. In addition, by causing axial movement of the drive shaft 201, the levers 25 can be moved in a back-and-forth direction so that the disk transfer chuck means 23a to 23d can be received and carry the disk D from and to the loader section 2, the washing stage 3a, the rinsing stage 3b, the drying stage 3c and the unloader stage 4, and be apart from these sections and stages, in turn.

Figure 6A:
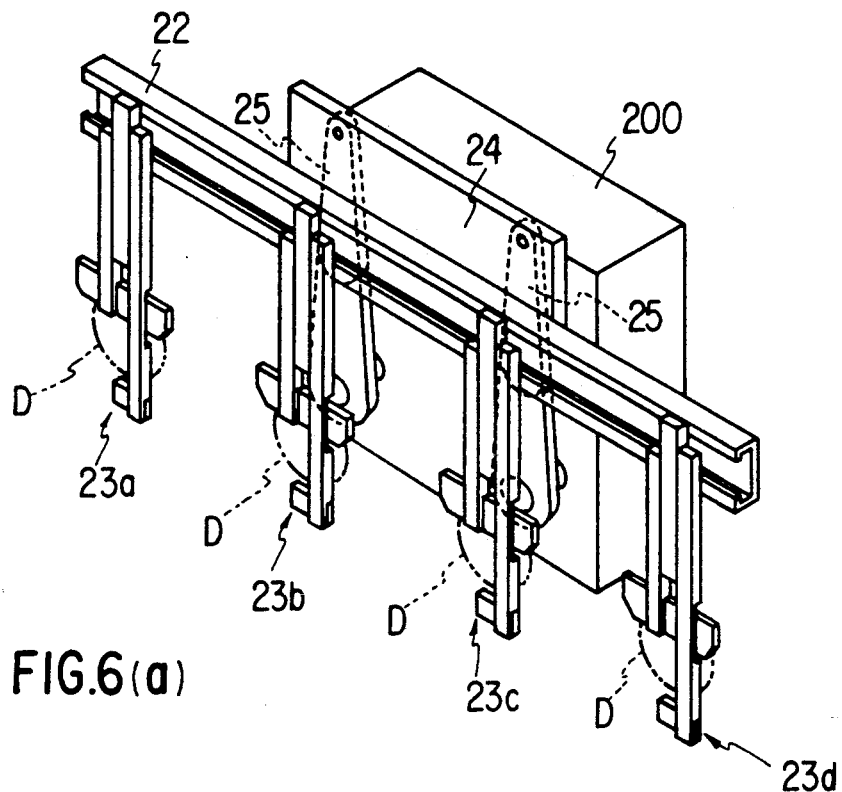
FIGS. 6a, 6b and 6c illustrate the specific construction of the stepwise disk feeder means of FIG. 6.
Figure 6B:
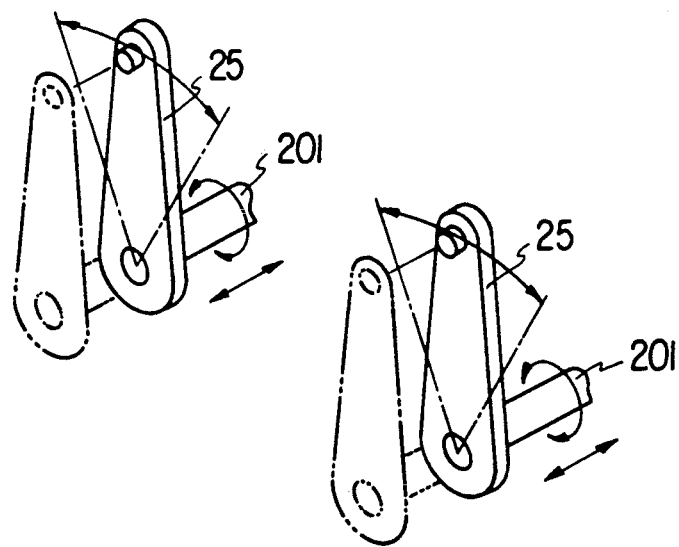
Figure 6C:
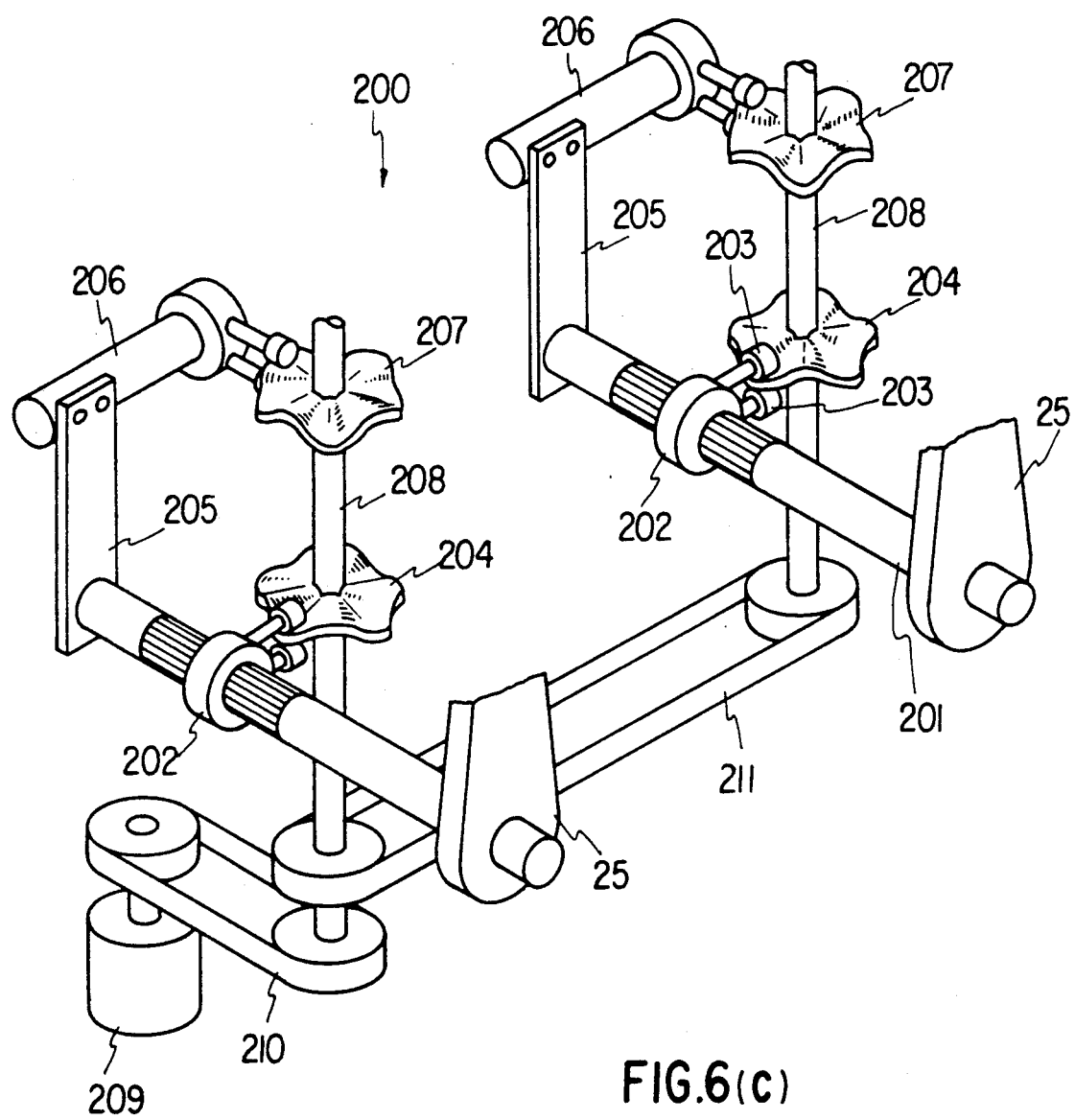
Figure 7:
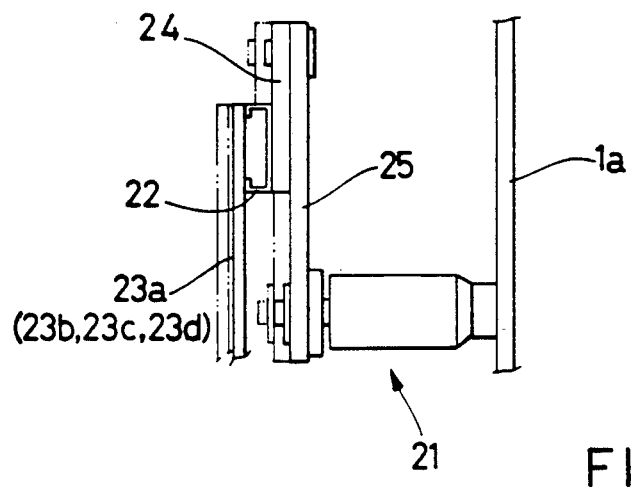
FIG. 7 is a schematic side of the feeder means of FIG. 6.

The motor-driven indexing mechanism 200 is constructed, for example, as shown in FIG. 6c. As seen from the drawing, the drive shaft 101 has splines on the outer periphery thereof and it is inserted into a bush 202 having a pair of cam followers 203, 203. A rotational cam plate 204 is inserted between the paired cam followers 203, 203 so that, when the cam plate 204 is rotated, the bush 202 and the drive shaft 201 can be rotated around their axes by rolling the cam followers 203 on the opposite cam surfaces thereof. In addition, to make the drive shaft 201 back-and-forth action along its axial direction, a flapper board 205 is provided to push the distal end of the drive shaft 201. The drive shaft 101 has a spring (not shown) to urge toward the flapper board 205. Therefore, the drive shaft 201 can be pushed against the spring by the swinging action of the flapper board 205 by the function of another rotating cam plate 207. The cam plates 204 and 207 are fitted onto a common rotational axis 208 which is rotated by a motor 209 through a transmission belt 210. In addition, a transmission belt 211 is provided between the two drive shafts 201, thereby ensuring simultaneous movement of the two shafts 201.

Consequently, of the disk transfer chuck means 23a to 23d, the first chuck means 23a in the leftmost position in FIG. 6 is reciprocable between the loader section 2 and the washing portion 3a, while the second to fourth chuck means 23b to 23d are reciprocable between the washing stage 3a and the rinsing stage 3b, between the rinsing stage 3b and drying stage 3c, and between the drying stage 3c and the unloader section 4, respectively. In FIG. 6, these four chuck members 23a to 23d are shown as located at sections, but the chuck member 23a is also indicated in phantom at the position of the loader section 2 for receiving the disk D from the loader chuck 11.

Figure 8:
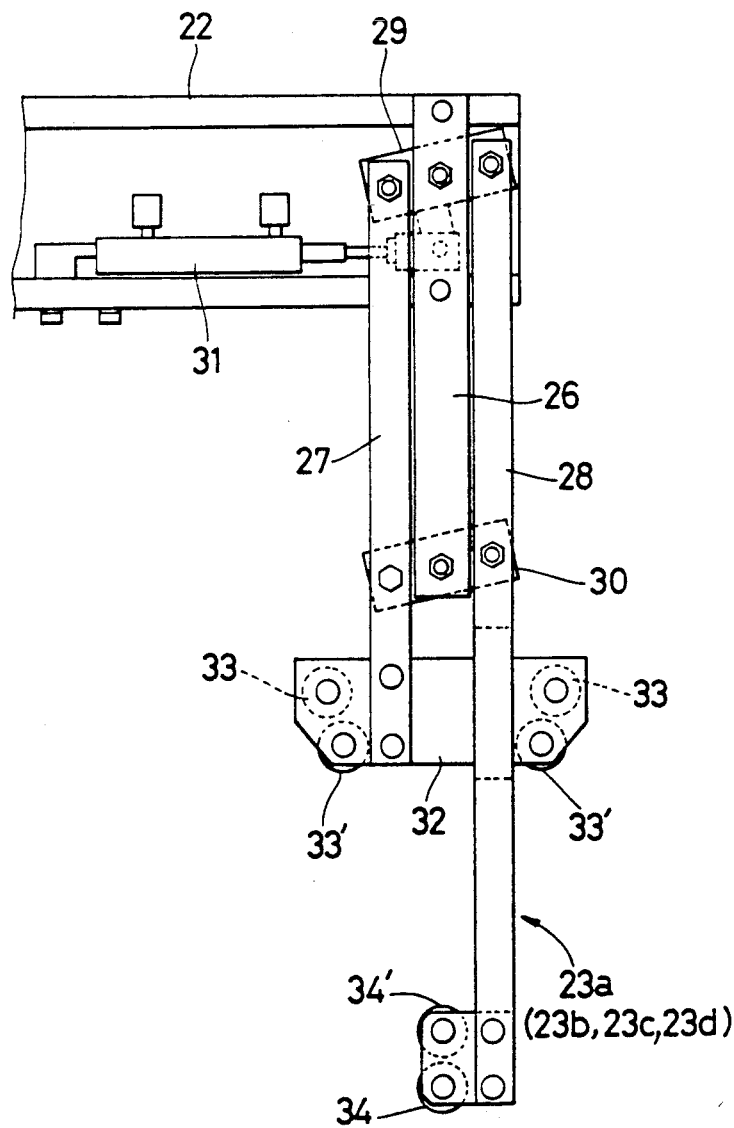
FIG. 8 is a schematic front view of a transfer chuck means.
Figure 9:
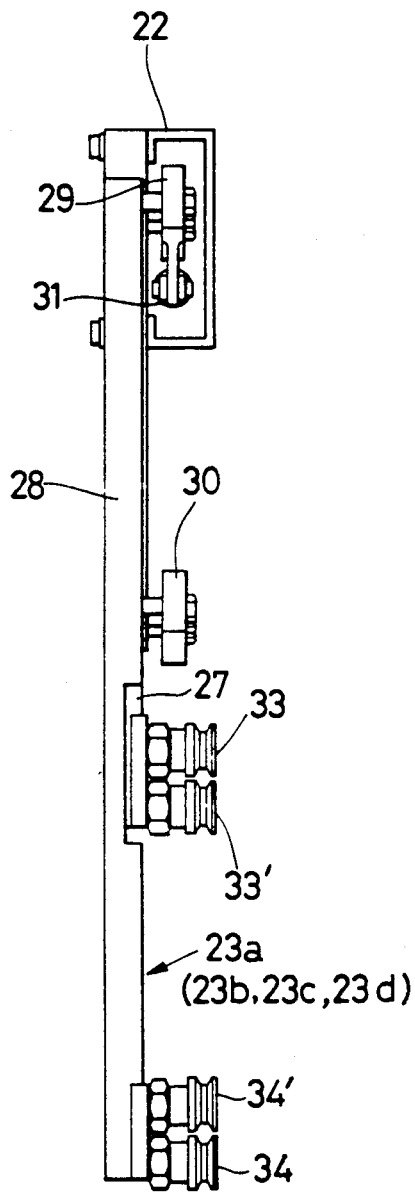
FIG. 9 is a schematic side view of the transfer chuck means of FIG. 8.

In this instance, the four disk transfer chuck means 23a to 23d which are mounted on the stepwise feeder means 21 are all arranged to hold the outer periphery of a disk D for transfer to a next stage, and have the same construction as shown particularly in FIGS. 8 and 9.

More specifically, each of the disk transfer chuck means includes a long bar member 26 pendant from the reciprocating plate member 22 and a pair of vertical link plates 27 and 28 disposed parallel to one another along the opposite sides of the pendant bar member 26. Horizontal link plates 29 and 30 which are pivotally connected to the bar member 26 are bridged between the aforementioned vertical link plates 27 and 28 in upper and lower positions thereby to form a parallel link mechanism. The upper horizontal link plate 29 is connected to a cylinder 31 which is operable to move the vertical link plates 27 and 28 parallelly in opposite directions. Securely fixed to one vertical link plate 27 is a plate member 32 which mounts a pair of chuck members 33 on the opposite side portions thereof, while one chuck member 34 is mounted on the other link plate 28. Consequently, as the link plates 29 and 30 are inclined to one side, the chuck members 33 and 34 are are moved toward each other to grip a disk D therebetween. Conversely, if the link plates 29 and 30 are inclined in the opposite direction, the chuck members 33 and 34 are moved away from each other to release the disk D.

In addition to the chuck members 33 and 34 which serve to grip a disk D of a relatively large diameter, chuck members 33' and 34' are detachably mounted on the vertical link plates 27 and 28 for gripping disks D of a relatively small diameter. The chuck members 33' and 34' for small disks are removed in an operation which handles disks of large diameters.

Accordingly, when the levers 25 are turned into the respective leftmost positions, the first disk transfer chuck means 23a is located in a disk receiving position in the loader section 2, as indicated by phantom lines in FIG. 6 the second transfer chuck means 23b is located in the washing stage 3a, the third chuck means 23c is located in the rinsing stage 3b, and the fourth chuck means 23d is located in the drying stage 3c. It follows that, upon actuating the disk transfer chuck means 23a to 23d, the disks D in the respective stages or sections are securely gripped by the corresponding chuck members.

In this state, if the levers 25 are turned in the direction of the arrow in FIG. 6, the first to fourth transfer chuck means 23a to 23d are turned into disk delivering positions of the washing stage 3a, rinsing stage 3b, drying stage 3c and unloader section 4, respectively, releasing the disks D there to hand them over to chuck mechanisms adapted to engage with the inner periphery of the disk D which are located at these disk delivering positions. Thus, by moving the disk transfer chuck means 23a to 23d back and forth, the disks D are sequentially fed to a succeeding stage or section.

While the disks D are undergoing the washing, rinsing and drying treatments, the disk transfer chuck means 23a to 23d may be retracted into a stand-by position between the loader section 2 and the washing stage 3a, a stand-by position between the washing stage 3a and the rinsing stage 3b, a stand-by position between the rinsing stage 3b and the drying stage 3c and a stand-by position between the drying stage 3c and the unloader section 4, respectively, as shown by solid lines in FIG. 6.

Concurrently, for assisting the hand-over of the disks D after the stepwise transfer to the delivering positions, arrangements are made to move the disk transfer chuck means 23a to 23d reciprocably between retracted positions where they hand over the disks D to disk chuck means 40 provided in the washing 3a and rinsing stage 3b of the working section 3 and a chuck means 102 of a spindle 100 provided in the drying stage 3c, as will be described in greater detail hereinlater, and advanced positions where they can move in the horizontal direction free of interference of the cooperating chuck means.

Figure 10:
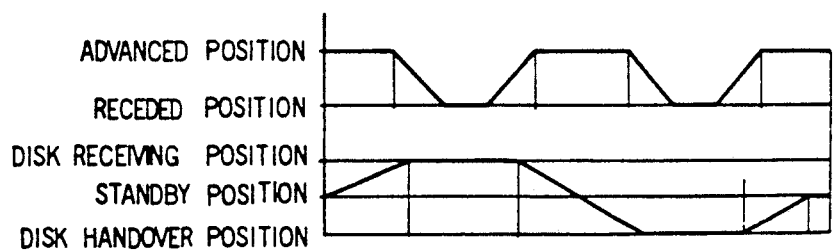
FIG. 10 is an operation timing chart of the feeder means.

As seen from the operation diagram shown in FIG. 10, the stepwise feeder means 21 is firstly retained in the disk receiving position to receive a disk or disks D, and, after a shift to the fore position, moved back to the disk delivering position and retracted into the receded position to hand over the disk or disks D. Then, it is moved into a stand-by position with a shift again into the fore position. In this state, the washing, rinsing and drying operations are effected on the disks D which are located in the washing, rinsing and drying stages 3a to 3c of the working section 3, respectively. Upon completion of these operations, the stepwise feeder means 21 is shifted to the disk receiving position to pick up the disks D. This cycle of operation is repeated to transfer the disks D successively from the loader section 2 to the washing state 3a, rinsing stage 3b, drying stage 3c and unloader section 4.

Figure 11:
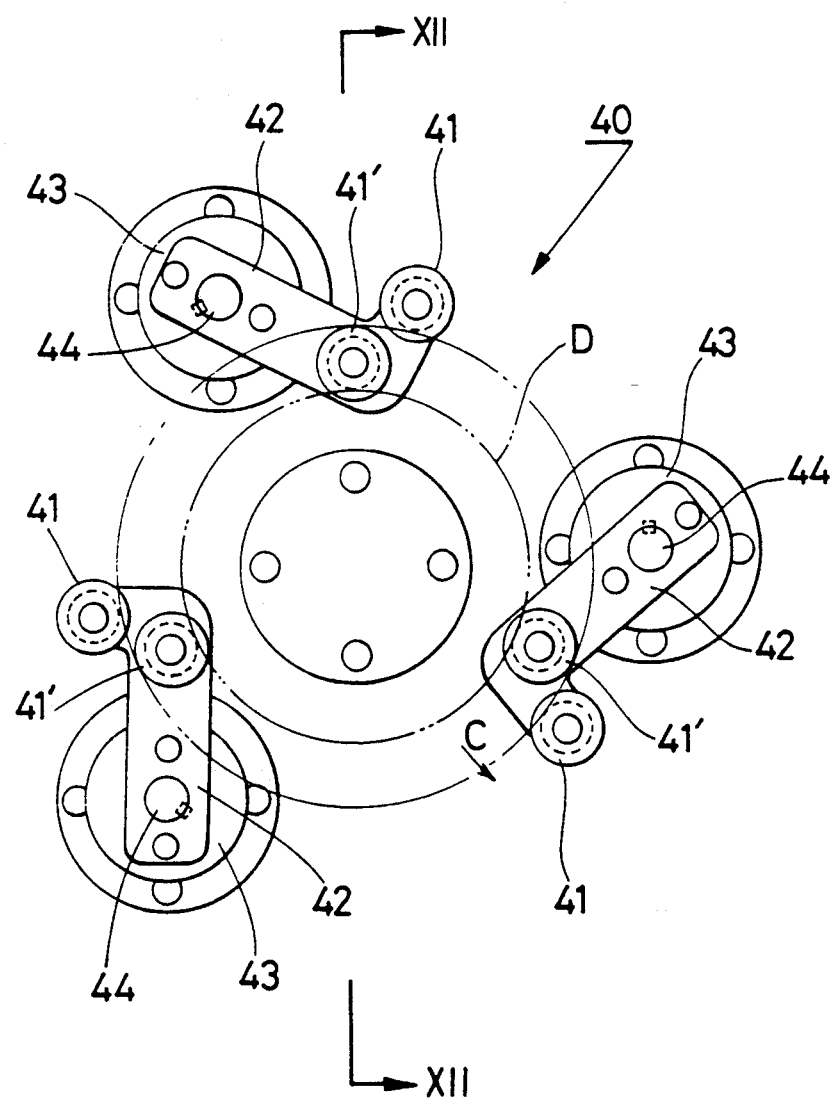
FIG. 11 is a schematic front view of a disk chuck means.
Figure 12:
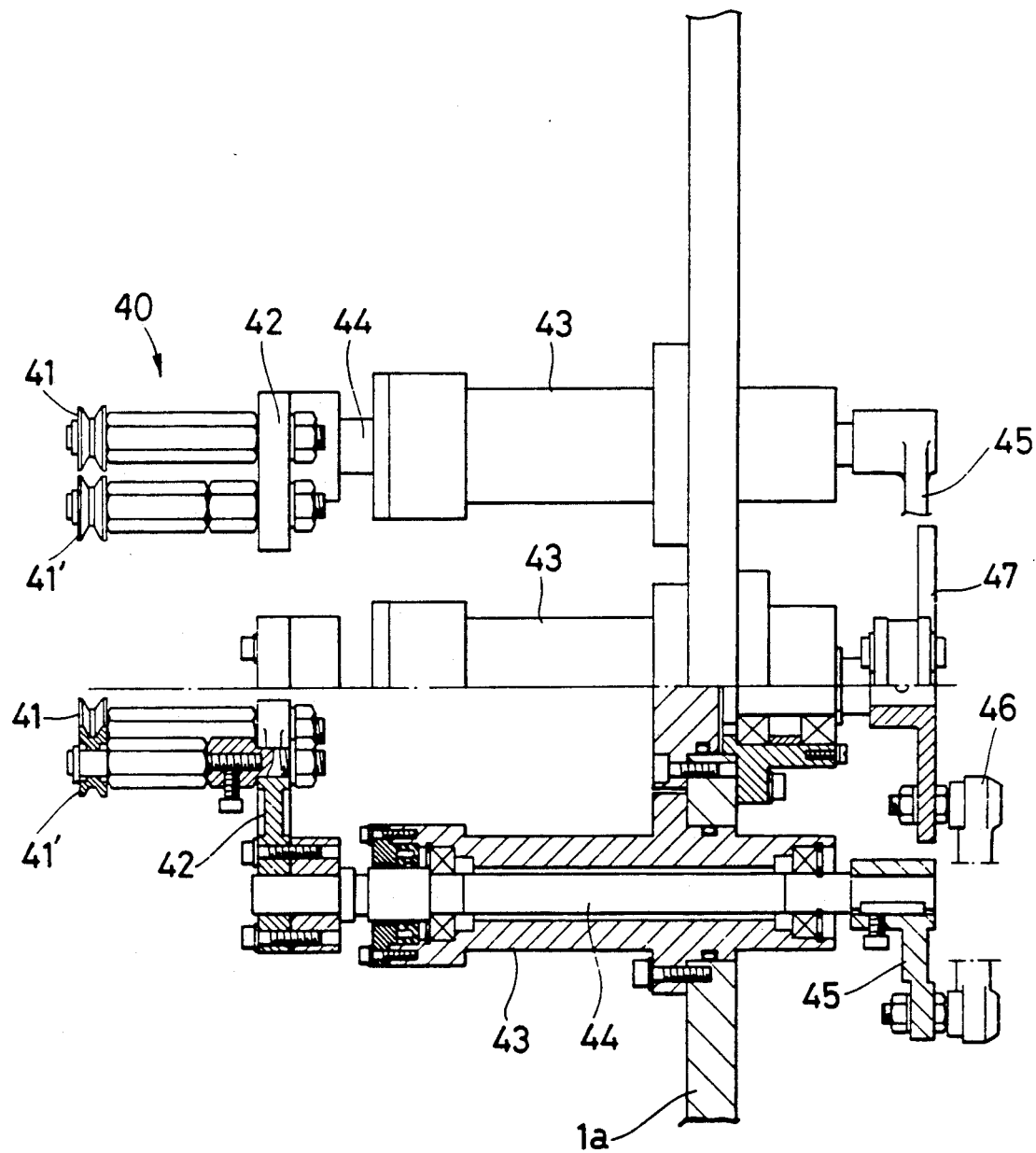
FIG. 12 is a schematic sectional view taken on line XII—XII of FIG. 11.
Figure 13:
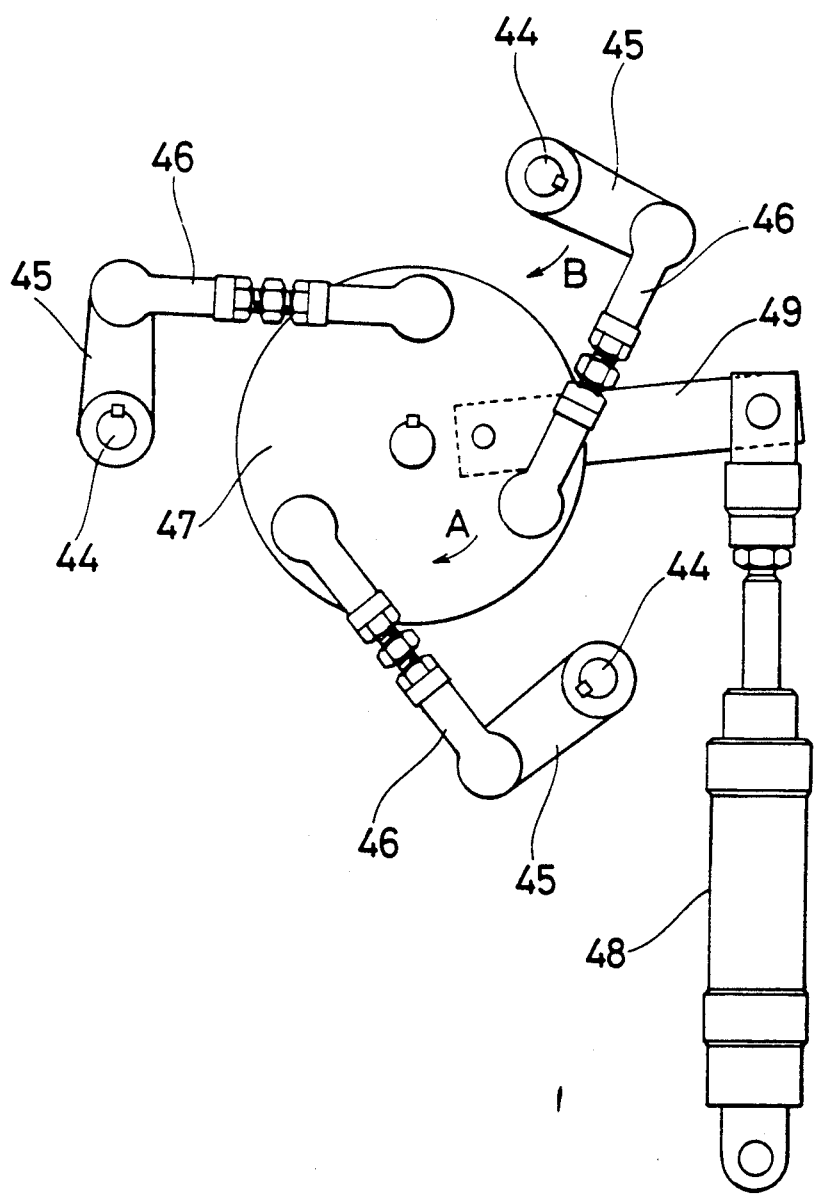
FIG. 13 is a schematic back view of the disk chuck means of FIG. 11.

The washing and rinsing stages 3a and 3b are each provided with a disk chuck means 40 as shown in FIGS. 11 to 13 thereby to hand over a disk D to and from the corresponding transfer chuck means. The disk chuck means 40 is provided with three chuck members 41 which are adapted to hold the outer periphery of a disk D. In order to avoid interference with the transfer chuck means 23a to 23d, these chuck members 41 are so located as to grip a disk D in a position with a predetermined phase difference from the transfer chuck means 23a to 23d. The disk chuck means 41 which is also adapted to hold the outer periphery of a disk has, similarly to the transfer chuck means 23a to 23d, large diameter disk chuck members 41 and small diameter disk chuck members 41' which are detachable in case of washing operations for large diameter disks.

Each one of the chuck members 41 of the disk chuck means 40 is mounted on a lever 42 which is pivotable for switching the chuck member 41 between a disk holding position and a disk releasing position. As shown in FIG. 12, the lever 42 is mounted on a shaft 44 which is inserted in a bearing bush 43, and reciprocally rotated through a predetermined angle upon rotating the shaft 44. Each one of the shafts 44 has the other end thereof connected to a drive lever 45 which is in turn connected to an arm 46. As clear from FIG. 13, each arm 46 has the other end thereof connected to a rotary disk 47 which is connected to a cylinder 48 through a lever 49.

Accordingly, as the cylinder 48 is operated to turn the rotary disk 47 in the direction of arrow A in FIG. 13, the drive lever 45 is turned in the direction of arrow B in the same figure, causing the shaft 44 to rotate in the same direction. As a result, the levers 42 are turned in the direction of arrow C to move the chuck member 41 outward into the disk releasing position away from the disk D. If the cylinder 48 is operated to turn the rotary disk 47 in the opposite direction, the chuck member 41 is moved inward to hold the disk D.

The disks D are securely held in the chuck members 40 in the washing and rinsing stages 3a and 3b as they receive the washing or rinsing treatment there. Besides, the washing and rinsing treatments are effected on the entire surfaces of the disk D including not only its front and rear faces but also edge portions at its inner and outer peripheries.

Figure 14:
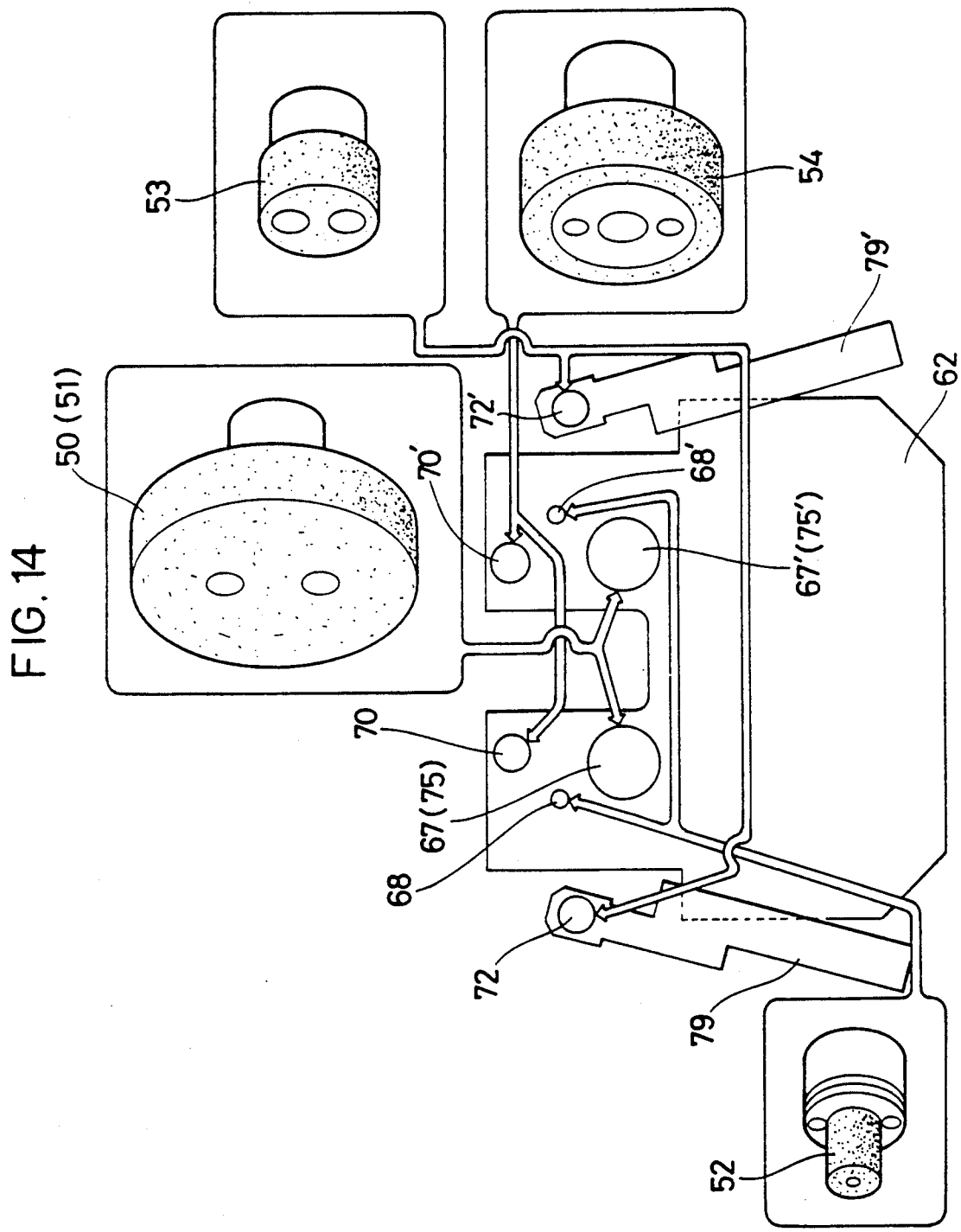
FIG. 14 is a schematic outer view of washing and rinsing brushes.
Figure 16:
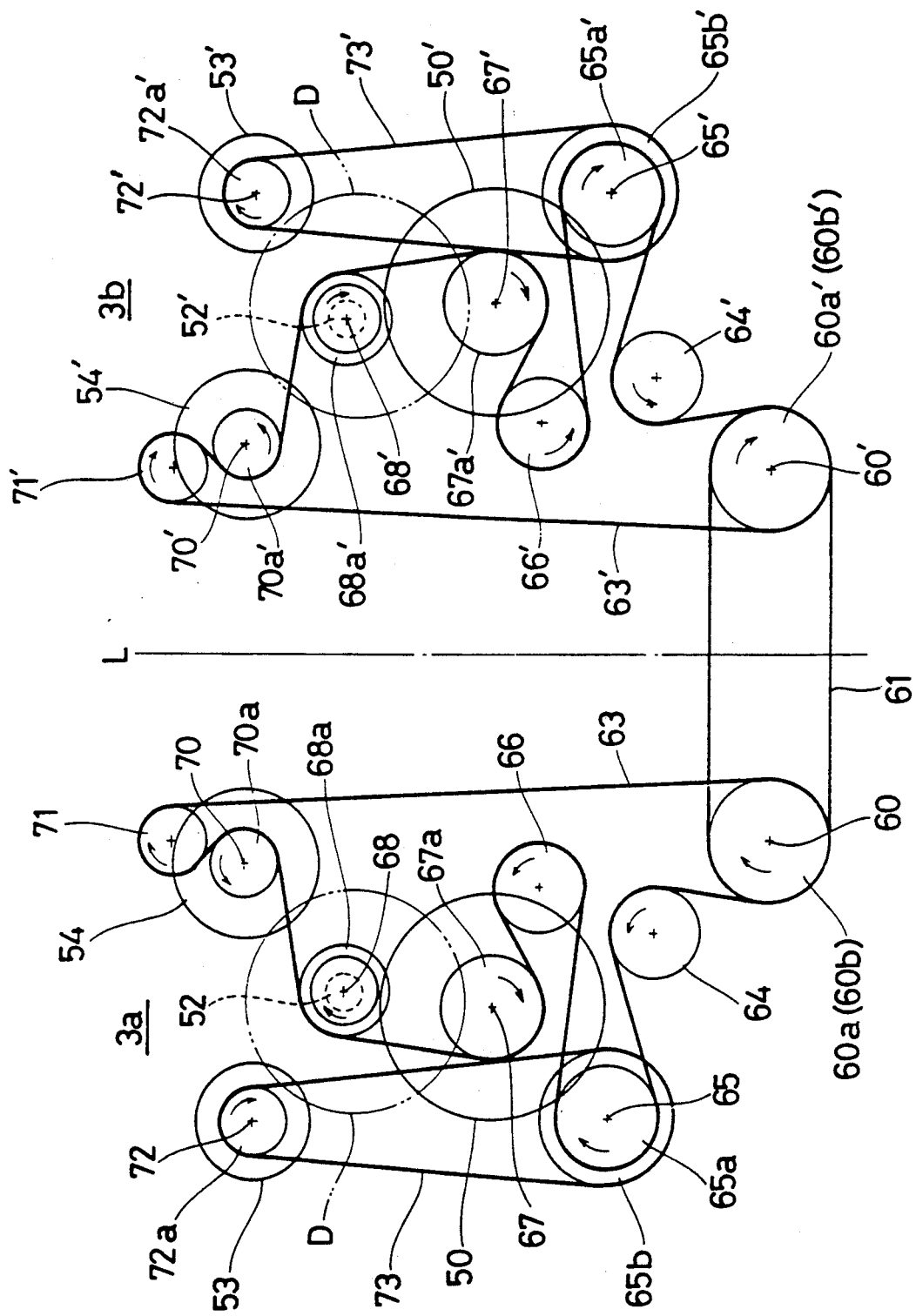
FIG. 16 is a diagrammatic illustration of brush drive mechanisms.

The washing and rinsing of disks D are carried out by the use of brushes including, as shown particularly in FIG. 14, face brushes 50 and 51 to be held in abutting engagement with the front and rear faces of the disk D and edge brushes 52 and 53 to be held in abutting engagement with the inner and outer peripheral edges of disks D. These brushes 50 to 54 are of soft and flexible material like sponge, and provided in each of the washing and rinsing stages 3a and 3b symmetrically on the opposite sides of a median border line L between the washing and rinsing stages 3a and 3b (FIG. 16).

For washing and rinsing the disks D, the brushes 50 to 54 as well as the disks D have to be put in rotation. In this connection, although the brushes 50 to 54 are positively driven to rotate, the disks D are not directly coupled with a rotational drive means. Namely, the respective disks D are caused to rotate by the brushes, which are in contact with the disks D, in such a manner as to follow the rotational movements of the brushes.

More specifically, as shown in FIG. 15, the face brushes 50 and 51 which grip therebetween the front and rear faces of a disk D are held in contact with the disk D in a sectoral shape, so that, when the face brushes 50 are rotated in the direction of arrow X, the disk D is caused to rotate in the direction of arrow Y, following the movements of the brushes 50 and 51. Further, since one edge brush 53 which is in abutting engagement with the outer periphery of the disk D is rotated in the same direction as the face brushes 50 and 51, the disk D is indirectly driven to rotate smoothly. The chuck members 41 which hold the disk D are rotatable in the respective positions to permit rotation of the disk D.

The brushing effect on the disk D is not sufficient in a case where a rotational force is applied only in one direction (i.e., only in the direction of arrow Y in FIG. 15). Therefore, the edge brush 52 which is held in abutting engagement with the inner peripheral edge of the disk D is rotated in X-direction, while the other edge brush 54 in abutting engagement with the outer peripheral edge is driven to rotate in the opposite direction or in Z-direction. Since the brush 54 is rotated in the opposite direction of the other brushes 50, 52 and 53, the rotation of the disk D in Y-direction is resisted by the opposite rotational force to produce the brushing effects on the disk surfaces more efficiently. To preclude a situation in which the resistance to the rotation of the disk D is increased to such a degree as to hinder smooth disk rotation, the brush 53 is pressed against the disk D with a greater force than the brush 54.

Figure 17:
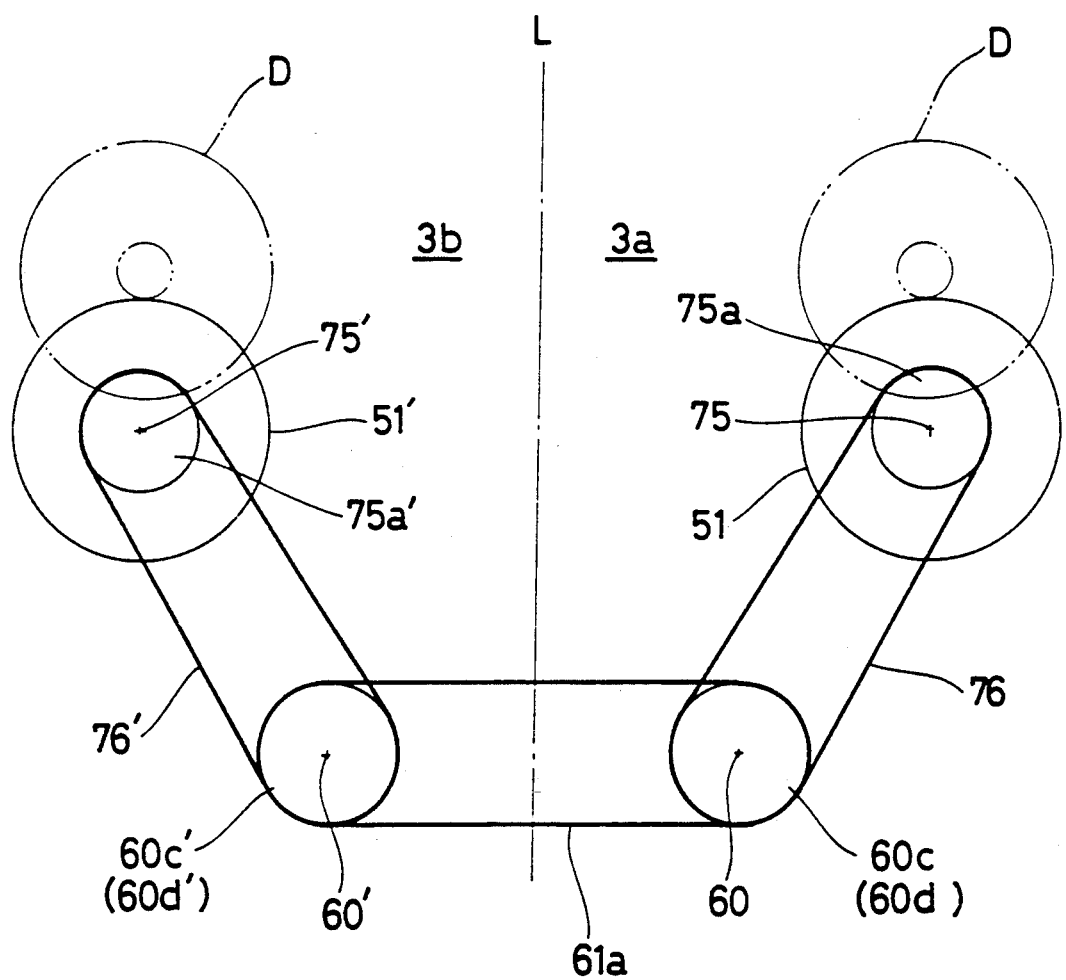
FIG. 17 is a diagrammatic illustration of a brush drive mechanism for the other disk face.

Illustrated in FIGS. 16 and 17 is a rotational transmission mechanism which drives the respective brushes 50 to 54 for the above-described operations. More specifically, a brush drive mechanism for the washing stage 3a and a similar brush drive mechanism for the rinsing stage 3b are located symmetrically on the opposite sides of the median border line L between these stages, and are mounted on support shafts 60 and 60', namely, the support shaft 60 (which is located on the side of the washing stage 3a in this particular embodiment) forms a drive shaft rotationally driven from a motor which is not shown, while the other support shaft 60' (i.e., the support shaft located on the side of the rinsing stage 3b) is retained in a non-rotatable state. A transmission belt 61 is passed around pulleys 60a and 60a' which are mounted on the support shafts 60 and 60', respectively.

As shown in FIG. 16, the brushes 50 and 52 to 54 of the brush drive units for the washing stage 3a are mounted on a mount plate 62, and, for rotationally driving the brushes 50 and 52 to 54, a first transmission belt 63 is passed around a pulley 60b which is mounted on the support shaft 60. This first transmission belt 63 is successively engaged with an idler 64, a pulley 65 mounted on a fulcrum shaft 65a, an idler 66, a pulley 67a mounted on a rotational drive shaft 67 for the brush 50 which is abutted against the face of the disk D, a pulley 68a mounted on a rotational drive shaft 68 for the brush 52 which is abutted against the inner peripheral edge of the disk D, a pulley 70a mounted on a rotational drive shaft 70 for the brush 54 which is abutted against the outer peripheral edge of the disk D, and an idler 71. Further, a second transmission belt 73 is passed around a pulley 65b which is mounted on the fulcrum shaft 65 and rotatable with the pulley 65a and around a pulley 72a which is mounted on a rotational drive shaft 72 for the brush 53 in abutting engagement with the outer peripheral edge of the disk D.

On the other hand, as shown in FIG. 17, the brush 51 which is abutted on the other face of the disk D is mounted on a shaft 75 which is supported on a mount plate 74 located on the opposite side of the disk D away from the afore-mentioned mount plate 62. A third transmission belt 76 is passed around a pulley 75a which is mounted on the shaft 75 and a pulley 60c which is mounted on the support shaft 60. Further, a transmission belt 61a similar to the belt 61 is passed around a pulley 60d which is mounted on the support shaft 60 and a pulley 60d' which is mounted on the support shaft 60' on the side of the rinsing stage 3b.

Accordingly, as the support shaft 60 is rotated in the arrowed direction in FIGS. 16 and 17, the transmission members which are driven by the shaft 60 are respectively rotated in the arrowed directions to drive the brushes 50 to 54 in the above-described directions. As a result, the face brushes 50 and 51 and the edge brushes 52 and 53 are rotated in the direction of arrow X, while the edge brush 54 is rotated in the opposite direction or in Z-direction, causing the disk D to rotate in Y-direction as it undergoes washing of its inner and outer peripheral edge portions simultaneously with washing of its front and rear faces.

The drive unit located on the opposite side, namely, on the side of the rinsing stage 3b is the same in construction as the drive unit on the side of the washing stage 3a except the symmetrical arrangement of its component parts relative to the latter. Therefore, the component parts of the drive unit of the rinsing stage 3b are indicated by attaching an apostrophe (') to the reference numeral of the corresponding component part in the washing stage 3a, and their description is omitted to avoid repetitions except the different mechanisms which will be explained hereinlater whenever necessary.

Figure 18:
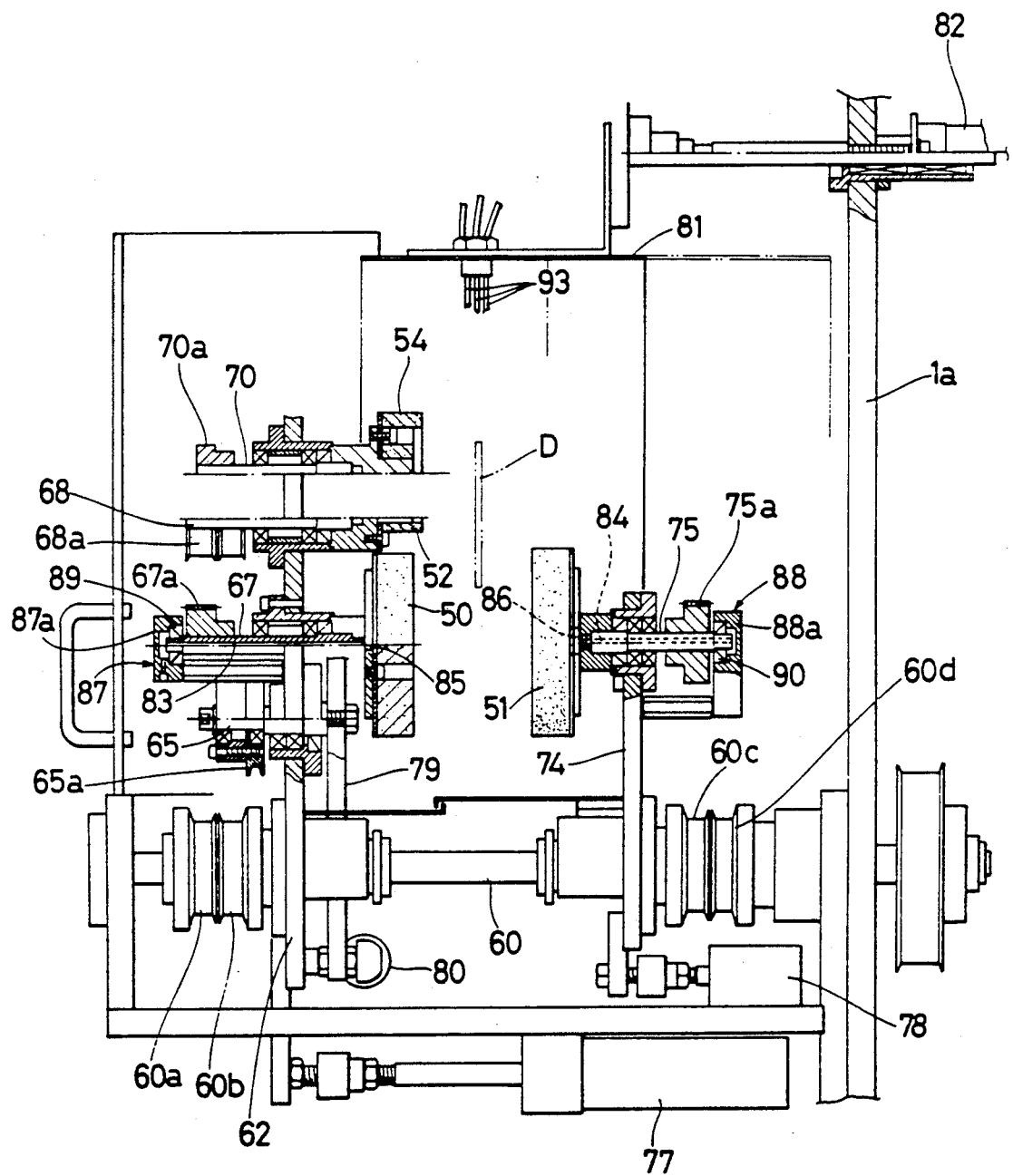
FIG. 18 is a schematic sectional view of a washing stage.

The disks D receive the washing and rinsing treatments in the washing and rinsing stages 3a and 3b on the entire surfaces including the front and rear faces as well as inner and outer peripheral edge portions. In order to permit delivery of the disks D into the washing and rinsing stages 3a and 3b, the mount plates 62 and 74 which support the brushes 50 and 52 to 54 are movable reciprocally toward and away from the disk D which is held in the disk chuck means 40. For this purpose, as shown in FIG. 18, the mount plates 62 and 74 are connected to cylinders 77 and 78, respectively, which are operable to move the brushes 50 to 54 on the mount plates 62 and 74 into stand-by positions remote from a disk which is held in the disk chuck means 40, or away from each other into operating positions for mounting the disk D on the disk chuck means 40.

The driving support shaft 60 is profiled or splined where it is coupled with the pulleys 60a to 60c, while no spline is provided on the support shaft 60' on the side of the rinsing stage 3b which functions as a follower shaft rotationally driven by the support shaft 60. The pulleys 60a and 60b as well as the pulleys 60c and 60d on the side of the washing state 3a may be provided in a connected form or may be separately mounted on the support shaft 60 in an interlocked state, but the pulleys 60a' and 60b' as well as the pulleys 60c' and 60d' on the support shaft 60' on the side of the rinsing stage 3b are rotated integrally with each other.

Figure 19:
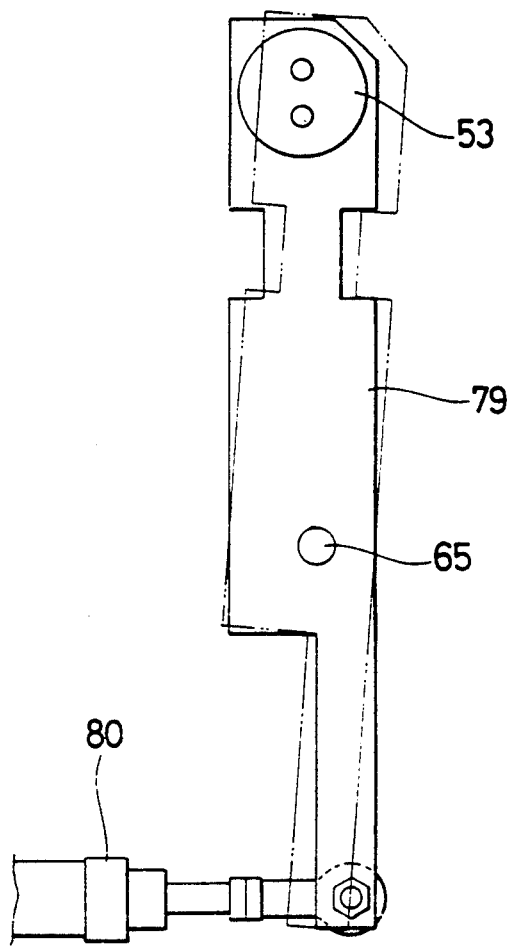
FIG. 19 is a diagrammatic view of a brush rocking mechanism for an edge brush on one side.
Figure 20:
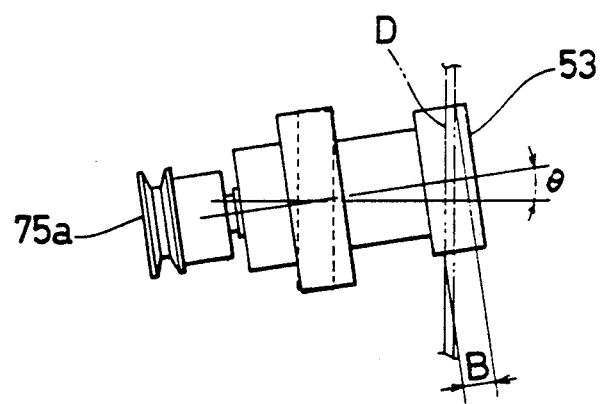
FIG. 20 is a diagrammatic illustration explanatory of the operation of the edge brush on one side.

The edge brush 53 which deeply engages the outer periphery of a disk D needs to be moved away therefrom when mounting the disk D on the disk chuck means 40. For this purpose, as shown in FIG. 19, the shaft 75 which supports the edge brush 53 is pivotally supported on a rocking plate 79 which is rockable about the fulcrum shaft 65 and reciprocally moved by a cylinder 80 between a position where the brush 53 is abutted against the outer peripheral edge of the disk D and a position away from the disk D. Further, as shown in FIG. 20, the edge brush 53 is tilted relative to the disk D by an angle $\theta$, and therefore when in rotation it is abutted against the outer peripheral edge of the disk D over the width B, brushing even the chamfered edge portions at the outer periphery of the disk D.

The disk is washed with a detergent such as a neutral cleaning solution of the like, and then rinsed with pure water. Booths 81 and 81' are provided in the washing and rinsing stages 3a and 3b, respectively, thereby to prevent splashes of the detergent and pure water from scattering around. The booths 81 and 81' are moved by cylinders 82 (FIG. 18) and 82' (not shown) between a position where they each cover a disk D on the disk chuck means 40 and a receded position where they are located close to the partition wall 1a to permit the operation of the disk transfer chuck means 23a and 23b (at the time of sending in the disk D) or chuck means 23b and 23c (at the time of sending out the disk D) of the stepwise feeder means 21.

Further, for supplying the detergent to the disk D in the washing stage 3a, the shafts 67 and 75 which support the face brushes 50 and 51 are in the form of hollow shafts open at the opposite ends and internally have through axial bores 83 and 84, respectively, as seen in FIG. 18, in communication with apertures 85 and 86 which are formed centrally in the support plates 50a and 51a of the face brushes 50 and 51. The rear ends of the shafts 67 and 75 are connected to detergent feed members 87 and 88, respectively. The detergent feed means 87 and 88 are provided with housings 87a and 88a which are coupled with the shafts 67 and 75 through seals 89 and 90 and which internally define liquid chambers in communication with the axial bores 83 and 84 in the shafts 67 and 75, respectively. The detergent feed members 87 and 88 are each connected to a detergent feed tube to receive a detergent to be fed to the disk D through the shafts 67 and 75 and face brushes 50 and 51. Although the edge brushes 52 to 54 are not supplied with the detergent in this particular embodiment, they may be arranged to receive a supply of detergent similarly to the face brushes if desirable.

On the other hand, rinsing pure water is supplied to the rinsing stage 3b through a plural number of pendant water nozzles 93' on the ceiling of the booth 81', pouring the rinsing water on the disk D t wash away the detergent from the disk D while the brushes 50' to 54' are in operation. Pendant water nozzles 93 are also provided in the ceiling wall of the washing stage 3a to shower water on the disk D upon completion of one cycle of washing operation, thereby washing away the detergent from the disk D to minimize the amount of the detergent which will be carried to the rinsing stage 3b.

Thus, the preceding and succeeding disks D which are fed to the washing and rinsing stages 3a and 3c by the disk transfer chuck means 23a and 23b of the stepwise feeder means 21 are mounted respectively on the disk chuck means 40 in the washing and rinsing stages 3a and 3b. As soon as the disk transfer chuck means 23a and 23b are moved away from the washing and rinsing stages 3a and 3b, the washing brushes 50 to 54 and the rinsing brushes 50' to 54' in rotation are abutted against the disks D, turning the latter by rotation of the brushes 50' to 54'. Concurrently, in the washing stage 3a, a detergent is supplied to the disk surfaces through the face brushes 50 and 51, and, in the rinsing stage 3b, pure water is supplied through the water feed nozzles 93', for washing and rinsing the disks D. In this instance, the washing and rinsing treatments are given efficiently at high speed, covering not only the front and rear faces but also the inner and outer peripheral edge portions of the disks D, and free of possibilities of recontamination of cleaned disks D.

Upon completion of the washing and rinsing operations, the disks D in the washing and rinsing stages 3a and 3b are transferred to the rinsing and drying stages 3b and 3c, respectively, by the disk transfer chuck means 23b and 23c of the stepwise feeder means 21. Prior to this disk transfer, pure water is supplied to the water feed nozzles 93 in the booth 81 of the washing stage 3a and showered on the disk D to wash away most of the detergent from the disk D and minimize the amount of the detergent which will be carried into the rinsing stage 3b along with the disk D.

The disk D from the loader section 2 is successively passed to the washing stage 3a and the rinsing stage 3b in the above-described manner and then transferred to the drying stage 3c by the transfer chuck means 23c of the stepwise feeder means 21. The drying stage 3c is provided with a spindle 100 as shown in FIG. 21, and thereby the disk D is rotated at high speed to remove water droplets and moisture therefrom by high speed spin drying.

In order to rotate the disk D in this manner, the spindle 100 includes a rotating portion 101 and three chuck members 102 which are mounted at the fore end of the rotating portion 101 for holding the inner periphery of a disk D. For moving these chuck members 102 into and out of engagement with the inner periphery of the disk D, each chuck member 102 is supported on a shaft 103 which is provided with a spherical portion 104 in an intermediate portion thereof, the spherical portion 104 being supported in a spherical socket portion 106 which is formed in an end plate 105 in the fore end portion of the rotating portion 102. The rear end of the shaft 103 is connected to a cam follower 107 which is pivotally fitted in a cam portion 109 of a cam block 108 of the rotating portion 102. Accordingly, when the cam follower 107 is located deeply in an inner position of the cam portion 109, the shaft 103 is retained substantially in a horizontal state, holding the chuck member in an outer position for holding the disk D. On the other hand, when the cam block 108 is shifted in the arrowed direction in FIG. 21, the cam follower 107 is rolled along the cam portion 109 so that the shafts 103 are tilted to bring the chuck member 102 into an inner releasing position away from the inner periphery of the disk D.

The rotating portion 101 is inserted in a bush 110 which is extended through the partition wall 1a toward the drive section 6 and rotationally driven from the latter. A transmission belt 111 is passed around a pulley 101a which is mounted on the rotating portion 101 and a drive pulley 113 which is mounted on a motor 112. Therefore, the rotating portion 101 of the spindle 100 is rotationally driven from the motor 112.

Figure 21:
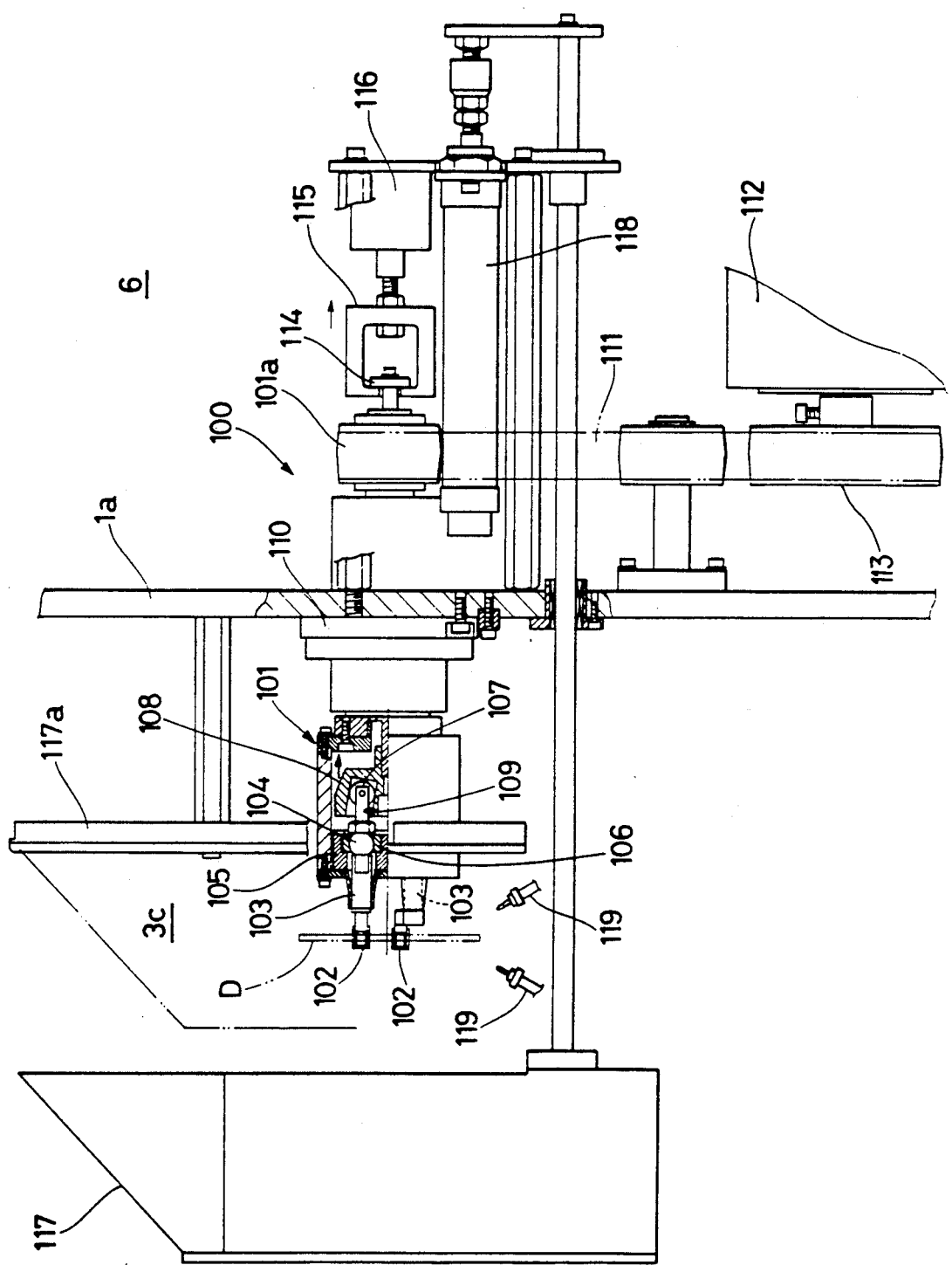
FIG. 21 is a schematic view of a drying stage.

For moving the chuck member 102 between the disk holding position and the disk releasing position, the rotating portion 101 has a link plate 114 mounted at its rear end on the side of the drive section 6, the link plate 114 being connected to a pull member 115 which is pulled in the arrowed direction in FIG. 21 by a cylinder 116. When pulled, the cam block 108 is moved to the right in the same figure, tilting the shaft 103 about the spherical portion 104 to disengage the chuck member 102 from the inner periphery of the disk D.

In the high speed spin drying, the disk D which is held in position on the spindle 100 by the chuck members 102 in this manner is rotated with the rotating portion 101 in high speed rotation. A drying booth 117 is provided in the drying stage 3c to prevent scattering of water droplets from the disk D. Similarly to the booths 81 and 81' in the washing and rinsing stages 3a and 3b, the drying booth 117 is moved by a cylinder 118 between a position (indicated by solid line in FIG. 21) where it permits the transfer of a disk D to the chuck members 102 of the spindle 100 and a position (indicated in phantom) where it covers a disk D which is being rotated on the spindle 100. When in the disk covering position, the drying booth is abutted against a fixed wall 117a which is provided in face to face relation with the drying booth 117. The upper and lateral side walls of the drying booth 117 are inclined at a predetermined angle such that the splashing water droplets from the disk D in high speed rotation rebound in directions away from the disk D after hitting on the inclined surfaces of the upper or side wall of the drying booth 117. There is no possibility of the rebound water droplets from the booth wall depositing on the disk D.

The drying stage 3c is provided with nozzles 119 which spurt heated pure water toward the disk D for heating up the disk D in an initial phase of the high speed spin drying operation until the rotation of the disk D by the spindle 100 reaches a normal state. The efficiency of the drying operation is improved markedly by heating the rotating disk D with a shower of heated pure water in this manner. The supply of heated pure water is stopped as soon as the rotation of the disk D reaches a normal state.

Figure 22:
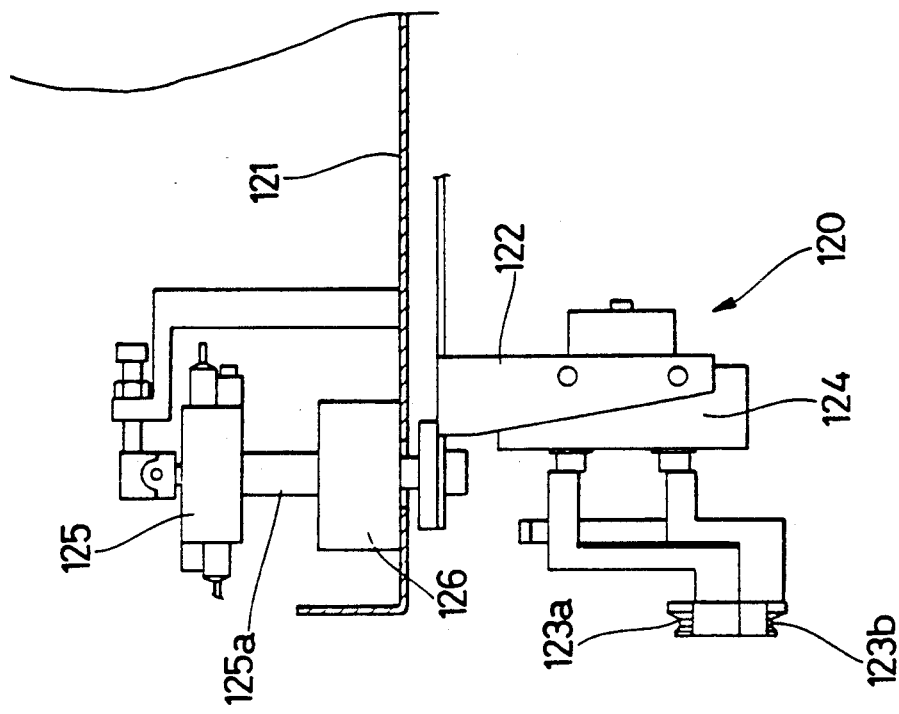
FIG. 22 is a schematic front view of an unloader chuck means.
Figure 23:
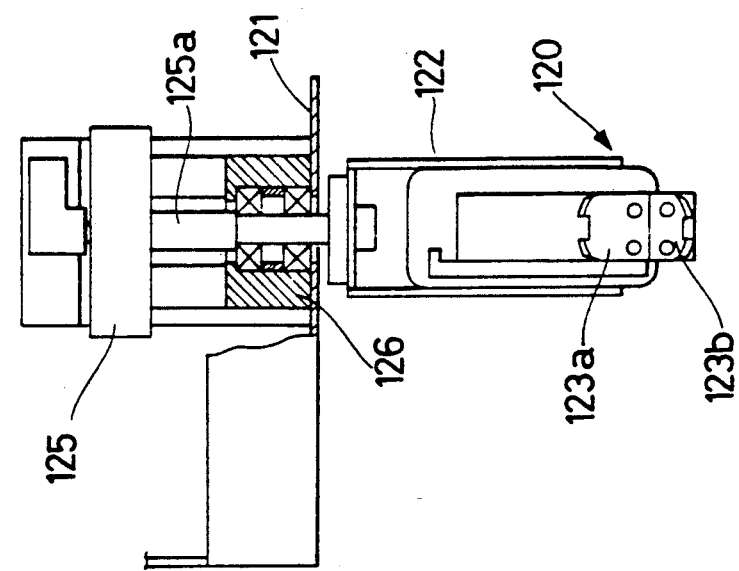
FIG. 23 is a back view of the chuck means shown in FIG. 22.

Upon completion of the above-described high speed spin drying, the disk D is taken out of the drying stage 3c and transferred to the unloader section 4 by the stepwise feeder means 21. The unloader section 4 is provided with an unloader chuck means 120 which is adapted to hold the inner periphery of the disk D transferred from the drying stage 3c. As shown particularly in FIGS. 22 and 23, the unloader chuck means 120 includes a pair of upper and lower chuck members 123a and 123b which are supported on a chuck mount member 122 pendant from an arm 121 which is moved up and down by a lifting cylinder or other suitable drive means. The chuck members 123a and 123b are movable toward and away from each other by operation of an actuator 124 which is mounted on the chuck mount member 122. Accordingly, the chuck members 123a and 123b are brought into disk releasing positions when the actuator 124 is operated to move them toward each other, and brought into disk holding positions in abutting engagement with the inner periphery of the disk D when the actuator 124 is operated to move them away from each other, namely, to move the chuck members 123a and 123b in upward and downward directions, respectively.

Further, mounted on the arm 121 is a rotary actuator 125 the output shaft 125a of which is extended downward through a bearing member 126 to support the chuck mount member 122. Therefore, by operating the rotary actuator 125, the chuck members 123a and 123b are turned around the output shaft 125a to reverse the disk D 180°.

When a disk D is delivered to the unloader section 4 by the chuck means 23d of the stepwise feed means 21 after the high speed spin drying, the unloader chuck means 120 is located in the upper or lifted position with the chuck mount member 122 turned to one side. As soon as the transfer chuck means 23d is moved into the unloader section 4, firstly the chuck members 123a and 123b of the unloader chuck means 120 are operated to hold the disk D, and then the transfer chuck means 23d is moved into the stand-by position after releasing the transfer chuck means 23d. In this state, the rotary actuator 125 is operated to turn its output shaft 125a through 180°, reversing the disk D which is held between the chuck members 123a and 123b. Thereafter, the unloader chuck means 120 is lowered to place the washed clean disk D on a magazine M on a conveyor 127 in the unloader section 4. When a predetermined number of clean disks D have been received on the magazine M, the latter can be taken out of the disk ejecting section 8.

In this instance, magazine transfer conveyers 10 and 127 are provided in the loader and unloader sections 2 and 4, respectively. A magazine M carrying disks D to be washed is placed on the conveyer 10 in the feeder section 7, and, while the magazine M is fed intermittently by the conveyer 10, the disks D are picked up one after another and washed clean as they are successively passed through the washing, rinsing and drying stages 3a to 3c of the working section 3. The cleaned disks D are successively placed on the magazine M on the conveyer 127 in the unloader section 4 as the latter is intermittently fed by an interval equal to the distance separating the disks placed therein by the conveyer 127, and finally taken out through the exit 8.

Figure 24:
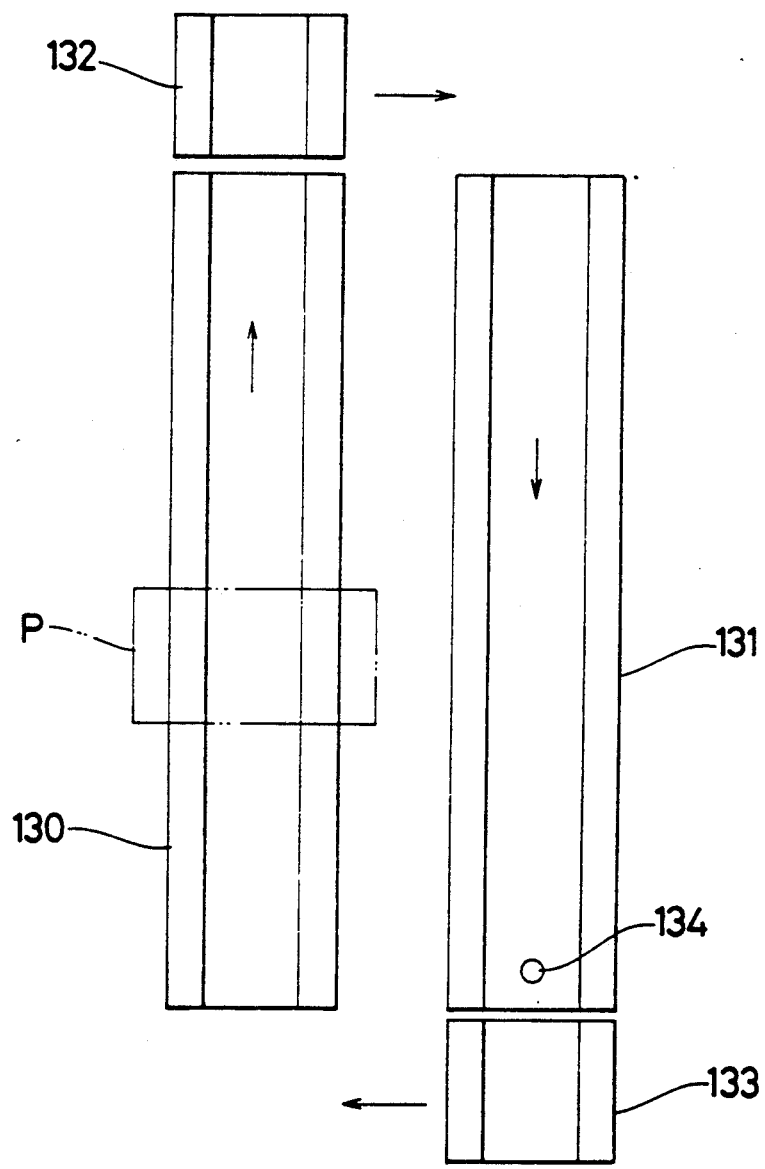
FIG. 24 is a diagrammatic illustration showing another example of arrangement of the magazine transfer conveyer.

It is desirable to construct the conveyers in the loader and unloader sections 2 and 4 in the manner as shown in FIG. 24 in order to reduce the frequency of replacement of the disk-carrying magazines M to and from the loader and unloader sections 2 and 4. More specifically, it is desirable to provide a couple of conveyers 130 and 131 as shown in FIG. 24 in combination with a first magazine transfer member 132 for transferring a magazine from conveyer 130 to conveyer 131 and a second magazine transfer member 133 for transferring a magazine from conveyer 131 to conveyer 130. The disk pickup position P is located at a median position on the conveyer 130, while a stopper 134 is provided at the end of the conveyer 131. The stopper 134 is protruded to stop a magazine M at the end of the conveyer 131, more specifically, an empty magazine M which has sent out all of the disks D in case of the loader section 2, or a magazine M which is fully laden with cleaned disks D to its capacity in case of the unloader section. In this connection, magazine loading and unloading portions are provided in side walls of the housing 1 of the washing apparatus by providing doors therein allowing magazine M to be introduced therethrough and ejected therefrom in place of the doors at the introducing portion 7 and the ejecting portion 8 as shown in FIG. 1.

Since all of the magazines M which are arranged side by side along the full length of the conveyer 131 can be replaced at one time, this arrangement permits to reduce the frequency of magazine replacement markedly and to rationalize the disk loading and unloading operations.

What is claimed is:

1. A disk washing apparatus for cleaning substrate disks of memory medium, comprising in combination:
   a loader section having a magazine for holding a number of disks to be washed;
   a working section including a washing stage adapted to wash the front and rear faces of a disk simultaneously with inner and outer peripheral surfaces thereof, a rinsing stage adapted to rinse the front and rear faces of a disk simultaneously with inner and outer peripheral surfaces thereof, and a drying stage adapted to dry a washed and rinsed disk by high speed spin drying;
   an unloader section having a magazine for accommodating cleaned disks; and
   a disk transfer means for transferring disks one after another and stepwise from said loader section to said unloader section, passing the disks successively to said washing, rinsing and drying stages of said working section, said washing, rinsing, and drying stages being located in series between said loader and unloader sections.

2. A disk washing apparatus as defined in claim 1, wherein said washing, rinsing and drying stages are located substantially at the same level and at uniform intervals, said loader and unloader sections are provided with a disk lift means for lifting up or down a disk between the level of said magazine and the level of said working section, and said disk transfer means includes four disk chuck mechanisms each movable to and from a disk receiving position in a preceding section or stage, a disk delivering position in a succeeding section or stage, and an intermediate stand-by position between said disk receiving and delivering positions.

3. A disk washing apparatus as defined in claim 2, wherein said disk chuck mechanisms of said disk transfer means are mounted at uniform intervals on a single drive plate and thereby integrally moved to and from said disk receiving position, disk delivering position and stand-by position.

4. A disk washing apparatus as defined in claim 2, wherein each of said disk chuck mechanisms is provided with three chuck members movable into and out of engagement with an outer peripheral edge of a disk, and operating members supporting said chuck members movably between a disk holding position and a disk releasing position.

5. A disk washing apparatus as defined in claim 4, wherein said disk chuck mechanism is provided with a plural number of sets of chuck members for holding different types of disks with different outer diameters, at least a set of chuck members for disks of small diameter being detachably mounted on said operating members.

6. A disk washing apparatus as defined in claim 1, wherein said washing stage includes as washing members a pair of face brushes driven from a rotational drive means to rotate in one direction and abuttingly engageable with the front and rear faces of a disk being washed in such a manner as to cause said disk to follow the rotation of the face brushes, and an edge brush abuttingly engageable with at least one of inner and outer peripheral edges of said disk and arranged to impose thereto a rotational force in a direction inverse to the direction of rotation of said disk.

7. A disk washing apparatus as defined in claim 6, wherein said washing stage includes an inner edge brush abuttingly engageable with the inner periphery of said disk, and an outer edge brush abuttingly engageable with the outer periphery of said disk.

8. A disk washing apparatus as defined in claim 7, wherein said at least one of said inner and outer edge brushes is driven to rotate in a direction inverse to the direction of rotation of said disk, while the other one of said edge brushes is rotated in the same direction as said disk.

9. A disk washing apparatus as defined in claim 1, wherein washing members and rinsing members in said washing and rinsing stages are located symmetrically on opposite sides of an intermediate border between said washing and rinsing stages.

10. A disk washing apparatus as defined in claim 9, wherein said washing members are rotated integrally by transmission belt means, and said rinsing members are similarly rotated integrally by transmission belt means.

11. A disk washing apparatus as defined in claim 10, wherein said transmission belt means for said washing members in said washing stage and said rinsing members in said rinsing stage are arranged to be driven commonly from a single drive means.

* * * * *